United States Patent
Wang et al.

(10) Patent No.: US 12,531,986 B2
(45) Date of Patent: *Jan. 20, 2026

(54) INTERPOLATION FILTER CLIPPING FOR SUB-PICTURE MOTION VECTORS

(71) Applicant: Huawei Technologies Co., Ltd., Guangdong (CN)

(72) Inventors: Ye-Kui Wang, San Diego, CA (US); Jianle Chen, San Diego, CA (US); Fnu Hendry, San Diego, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/742,363

(22) Filed: Jun. 13, 2024

(65) Prior Publication Data
US 2025/0008095 A1 Jan. 2, 2025

Related U.S. Application Data

(63) Continuation of application No. 17/470,376, filed on Sep. 9, 2021, now Pat. No. 12,028,517, which is a
(Continued)

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/119* (2014.11);
(Continued)

(58) Field of Classification Search
CPC .. H04N 19/117; H04N 19/105; H04N 19/119; H04N 19/132; H04N 19/137;
(Continued)

(56) References Cited

U.S. PATENT DOCUMENTS 9,462,298 B2 10/2016 Chong et al.
11,140,386 B2 * 10/2021 Zhang ............... H04N 19/70
(Continued)

FOREIGN PATENT DOCUMENTS

CN 108293136 A 7/2018
EP 2728876 A1 5/2014
(Continued)

OTHER PUBLICATIONS

Benjamin Bross et al., "Versatile Video Coding (Draft 3)", Document: JVET-L1001-v9, Joint Video Experts Team (JVET) of ITU-T SG 16 WP 3 and ISO/IEC JTC 1/SC 29/WG 11,12th Meeting:Macao,CN,3 Oct. 12, 2018, XP030252734, total 235 pages.
(Continued)

*Primary Examiner* — Nasim N Nirjhar
(74) *Attorney, Agent, or Firm* — Conley Rose, P.C.

(57) ABSTRACT

A video coding mechanism is disclosed. The mechanism includes receiving a bitstream comprising a current picture including a sub-picture coded according to inter-prediction. A motion vector for a block of the sub-picture is determined. A clipping function is applied to sample locations in a reference block to support application of an interpolation filter when the motion vector points outside of the sub-picture and when a flag is set to indicate the sub-picture is treated as a picture. The interpolation filter is applied to results of the clipping function to obtain a predicted sample value. The block is decoded based on the predicted sample value. The block is forwarded for display as part of a decoded video sequence.

9 Claims, 14 Drawing Sheets

Related U.S. Application Data continuation of application No. PCT/US2020/022083, filed on Mar. 11, 2020.

(60) Provisional application No. 62/826,659, filed on Mar. 29, 2019, provisional application No. 62/816,751, filed on Mar. 11, 2019.

(51) Int. Cl.
| | |
|---|---|
| *H04N 19/119* | (2014.01) |
| *H04N 19/132* | (2014.01) |
| *H04N 19/137* | (2014.01) |
| *H04N 19/159* | (2014.01) |
| *H04N 19/172* | (2014.01) |
| *H04N 19/174* | (2014.01) |
| *H04N 19/176* | (2014.01) |
| *H04N 19/184* | (2014.01) |
| *H04N 19/186* | (2014.01) |
| *H04N 19/46* | (2014.01) |
| *H04N 19/52* | (2014.01) |
| *H04N 19/593* | (2014.01) |
| *H04N 19/70* | (2014.01) |
| *H04N 19/82* | (2014.01) |
| *H04N 19/86* | (2014.01) |
| *H04N 19/96* | (2014.01) |

(52) U.S. Cl.
CPC ......... *H04N 19/132* (2014.11); *H04N 19/137* (2014.11); *H04N 19/159* (2014.11); *H04N 19/172* (2014.11); *H04N 19/174* (2014.11); *H04N 19/176* (2014.11); *H04N 19/184* (2014.11); *H04N 19/186* (2014.11); *H04N 19/46* (2014.11); *H04N 19/52* (2014.11); *H04N 19/593* (2014.11); *H04N 19/70* (2014.11); *H04N 19/82* (2014.11); *H04N 19/86* (2014.11); *H04N 19/96* (2014.11)

(58) Field of Classification Search
CPC .. H04N 19/159; H04N 19/172; H04N 19/174; H04N 19/176; H04N 19/184; H04N 19/186; H04N 19/46; H04N 19/52; H04N 19/593; H04N 19/70; H04N 19/82; H04N 19/86; H04N 19/96

See application file for complete search history.

(56) References Cited

U.S. PATENT DOCUMENTS

| | | |
|---|---|---|
| 2007/0183676 A1 | 8/2007 | Hannuksela et al. |
| 2013/0107973 A1 | 5/2013 | Wang et al. |
| 2013/0202051 A1 | 8/2013 | Zhou |
| 2013/0208806 A1 | 8/2013 | Hu et al. |
| 2013/0208808 A1 | 8/2013 | Sasai et al. |
| 2014/0037011 A1 | 2/2014 | Lim et al. |
| 2014/0161189 A1* | 6/2014 | Zhang .................. H04N 19/103 375/240.16 |
| 2014/0254666 A1 | 9/2014 | Rapaka et al. |
| 2014/0369415 A1 | 12/2014 | Naing et al. |
| 2015/0010091 A1 | 1/2015 | Hsu et al. |
| 2016/0080753 A1 | 3/2016 | Oh et al. |
| 2017/0085917 A1 | 3/2017 | Hannuksela |
| 2018/0091825 A1* | 3/2018 | Zhao .................. H04N 19/117 |
| 2019/0075328 A1 | 3/2019 | Huang et al. |

FOREIGN PATENT DOCUMENTS

| | | |
|---|---|---|
| JP | 2018056685 A | 4/2018 |
| WO | 2014051915 A1 | 4/2014 |
| WO | 2015007946 A1 | 1/2015 |

OTHER PUBLICATIONS

Minhua Zhou "AHG4: Enable parallel decoding with tiles," Document: JCTVC-I0118,M24357 Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012, XP030052702, total 9 pages.

Hannuksela Miska M et al., "Sub-picture video coding for unequal error protection," 2010 18th European Signal Processing Conference, IEEE, Sep. 3, 2002, pp. 1-4, XP032754192.

Document: JVET-N0826-v1, Wang, Y.K., et al., "AHG12: Harmonized proposal for sub-picture-based coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.

Document: JVET-Q0352, Jang, H., et al., "AHG9/AHG12: On subpicture boundary", Joint Video Experts Team (JVET) of ITU-T SG 16 WP 3 and ISO/IEC JTC 1/SC 29/WG 11, 17th Meeting: Brussels, BE, Jan. 7-17, 2020, 12 pages.

Hannuksela, M., et al., "Sub-Picture Video Coding for Unequal Error Protection", Mar. 2002, 4 pages.

"Line Transmission of Non-Telephone Signals, Video Codec for Audiovisual Services at p×64 kbits," ITU-T, H.261, Mar. 1993, 29 pages.

"Transmission of Non-Telephone Signals, Information Technology—Generic Coding of Moving Pictures and Associated Audio Information: Video," H.262, Jul. 1995, 211 pages.

"Series H: Audiovisual and Multimedia Systems, Infrastructure of audiovisual services—Coding of moving video, Video coding for low bit rate communication," ITU-T, H.263, Jan. 2005, 226 pages.

"Series H: Audiovisual and Multimedia Systems, Infrastructure of audiovisual services—Coding of moving video, Advanced video coding for generic audiovisual services," ITU-T, H.264, Jun. 2019, 836 pages.

"Series H: Audiovisual and Multimedia Systems, Infrastructure of audiovisual services—Coding of moving video, High efficiency video coding," H.265, Apr. 2013, 317 pages.

Bross, B., et al., "Versatile Video Coding (Draft 3)," JVET-L1001-v3, Oct. 3-12, 2018, 181 pages.

JVET-M1001-v6, "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, Jan. 9-18, 2019, 298 pages.

JVET-M0261, "AHG12: On grouping of tiles," Joint Video Experts Team (JVET) of ITU-T SG 16 WP 3 and ISO/IEC JTC 1/SC 29/WG 11, 13th Meeting: Marrakech, MA, Jan. 9-18, 2019, 11 pages.

JCTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.

Document: JVET-M0136-v1, Chen, J., et al., "AHG12: Treating tile and tile group boundaries as picture boundaries," Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

* cited by examiner

INTERPOLATION FILTER CLIPPING FOR SUB-PICTURE MOTION VECTORS

CROSS-REFERENCE TO RELATED APPLICATIONS

This patent application is a continuation of U.S. application Ser. No. 17/470,376 filed on Sep. 9, 2021, which is a continuation of International Application No. PCT/US2020/022083 filed Mar. 11, 2020, which claims the benefit of U.S. Provisional Patent Application No. 62/816,751 filed Mar. 11, 2019, and U.S. Provisional Patent Application No. 62/826,659 filed Mar. 29, 2019, all of which are hereby incorporated by reference.

TECHNICAL FIELD

The present disclosure is generally related to video coding, and is specifically related to coding sub-pictures of pictures in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising a current picture including a sub-picture coded according to inter-prediction; determining, by a processor of the decoder, a motion vector for a block of the sub-picture; applying, by the processor, a clipping function to sample locations in a reference block to support application of an interpolation filter when the motion vector points outside of the sub-picture and when a flag is set to indicate the sub-picture is treated as a picture; applying, by the processor, the interpolation filter to results of the clipping function to obtain a predicted sample value; and decoding, by the processor, the block based on the predicted sample value. Inter-prediction may be performed according to one of several inter-prediction modes. Certain inter-prediction modes generate candidate lists of motion vector predictors at both the encoder and the decoder. This allows the encoder to signal a motion vector by signaling the index from the candidate list instead of signaling the entire motion vector. Further, some systems encode sub-pictures for independent extraction. This allows a current sub-picture to be decoded and displayed without decoding information from other sub-pictures. This may cause errors when a motion vector is employed that points outside of the sub-picture because the data pointed to by the motion vector may not be decoded and hence may not be available. The present disclosure includes a flag that indicates a sub-picture should be treated as a picture. When a current sub-picture is treated like a picture, the current sub-picture should be extracted without reference to other sub-pictures. Specifically, the present example employs a clipping function that is applied when applying interpolation filters. This clipping function ensures that the interpolation filter does not rely on data from adjacent sub-pictures in order to maintain separation between the sub-pictures to support separate extraction. As such, the clipping function is applied when the flag is set and a motion vector points outside of the current sub-picture. The interpolation filter is then applied to the results of the clipping function. Accordingly, the present example provides additional functionality to a video codec by preventing errors when performing sub-picture extraction.

Optionally, in any of the preceding aspects, another implementation of the aspect provides, wherein the interpolation filter includes a luma sample bilinear interpolation process, wherein the block includes a block of luma samples, and wherein the predicted sample value includes a predicted luma sample value.

Optionally, in any of the preceding aspects, another implementation of the aspect provides, wherein the luma sample bilinear interpolation process receives inputs including a luma location in full sample units (xIntL, yIntL), wherein the luma sample bilinear interpolation process outputs a predicted luma sample value (predSampleLXL), and wherein the clipping function is applied to the sample locations according to: when subpic_treated_as_pic_flag [SubPicIdx] is equal to one, the following applies:

xInti=Clip3(SubPicLeftBoundaryPos, SubPicRightBoundaryPos, xIntL+i), and yInti=Clip3(SubPicTopBoundaryPos, SubPicBotBoundaryPos, yIntL+i), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$\text{Clip3}(x, y, z) = \begin{cases} x; & z < x \\ y; & z > y \\ z; & \text{otherwise} \end{cases}$$

where x, y, and z are numerical input values.

Optionally, in any of the preceding aspects, another implementation of the aspect provides, wherein the interpolation filter includes a luma sample eight tap interpolation filtering process, wherein the block includes a block of luma samples, and wherein the predicted sample value includes a predicted luma sample value.

Optionally, in any of the preceding aspects, another implementation of the aspect provides, wherein the luma sample eight tap interpolation filtering process receives inputs including a luma location in full sample units (xIntL, yIntL), wherein the luma sample bilinear interpolation process outputs a predicted luma sample value (predSampleLXL), and wherein the clipping function is applied to the sample locations according to: when subpic_treated_as_pic_flag[SubPicIdx] is equal to one, the following applies:

xInti=Clip3(SubPicLeftBoundaryPos, SubPicRightBoundaryPos, xIntL+$i$−3), and yInti=Clip3(SubPicTopBoundaryPos, SubPicBotBoundaryPos, yIntL+$i$−3), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$\text{Clip3}(x, y, z) = \begin{cases} x; & z < x \\ y; & z > y \\ z; & \text{otherwise} \end{cases}$$

where x, y, and z are numerical input values.

Optionally, in any of the preceding aspects, another implementation of the aspect provides, wherein the interpolation filter includes a chroma sample interpolation process, wherein the block includes a block of chroma samples, and wherein the predicted sample value includes a predicted chroma sample value.

Optionally, in any of the preceding aspects, another implementation of the aspect provides, wherein the chroma sample interpolation process receives inputs including a chroma location in full sample units (xIntC, yIntC), wherein the chroma sample interpolation process outputs a predicted chroma sample value (predSampleLXC), and wherein the clipping function is applied to the sample locations according to: when subpic_treated_as_pic_flag[SubPicIdx] is equal to one, the following applies:

xInti=Clip3(SubPicLeftBoundaryPos/SubWidthC, SubPicRightBoundaryPos/SubWidthC, xIntC+$i$), and yInti=Clip3(SubPicTopBoundaryPos/SubHeightC, SubPicBotBoundaryPos/SubHeightC, yIntC+$i$), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, Sub WidthC and SubHeightC indicate a horizontal and vertical sampling rate ratio between luma and chroma samples, and Clip3 is the clipping function according to:

$$\text{Clip3}(x, y, z) = \begin{cases} x; & z < x \\ y; & z > y \\ z; & \text{otherwise} \end{cases}$$

where x, y, and z are numerical input values.

In an embodiment, the disclosure includes a method implemented in an encoder, the method comprising: partitioning, by a processor of the encoder, a current picture into a sub-picture and the sub-picture into a block; determining, by the processor, to encode the block according to inter-prediction; selecting, by the processor, a motion vector to encode the block; applying, by the processor, a clipping function to sample locations in a reference block to support application of an interpolation filter when the motion vector points outside of the sub-picture and when a flag is set to indicate the sub-picture is treated as a picture; applying, by the processor, the interpolation filter to results of the clipping function to obtain a predicted sample value; encoding, by the processor, the block into a bitstream based on the predicted sample value and the motion vector; and storing, by a memory coupled to the processor, the bitstream for communication toward a decoder. Inter-prediction may be performed according to one of several inter-prediction modes. Certain inter-prediction modes generate candidate lists of motion vector predictors at both the encoder and the decoder. This allows the encoder to signal a motion vector by signaling the index from the candidate list instead of signaling the entire motion vector. Further, some systems encode sub-pictures for independent extraction. This allows a current sub-picture to be decoded and displayed without decoding information from other sub-pictures. This may cause errors when a motion vector is employed that points outside of the sub-picture because the data pointed to by the motion vector may not be decoded and hence may not be available. The present disclosure includes a flag that indicates a sub-picture should be treated as a picture. When a current sub-picture is treated like a picture, the current sub-picture should be extracted without reference to other sub-pictures. Specifically, the present example employs a clipping function that is applied when applying interpolation filters. This clipping function ensures that the interpolation filter does not rely on data from adjacent sub-pictures in order to maintain separation between the sub-pictures to support separate extraction. As such, the clipping function is applied when the flag is set and a motion vector points outside of the current sub-picture. The interpolation filter is then applied to the results of the clipping function. Accordingly, the present example provides additional functionality to a video codec by preventing errors when performing sub-picture extraction.

Optionally, in any of the preceding aspects, another implementation of the aspect provides, wherein the interpolation filter includes a luma sample bilinear interpolation process, wherein the block includes a block of luma samples, and wherein the predicted sample value includes a predicted luma sample value.

Optionally, in any of the preceding aspects, another implementation of the aspect provides, wherein the luma sample bilinear interpolation process receives inputs including a luma location in full sample units (xIntL, yIntL), wherein the luma sample bilinear interpolation process outputs a predicted luma sample value (predSampleLXL), and wherein the clipping function is applied to the sample locations according to: when subpic_treated_as_pic_flag [SubPicIdx] is equal to one, the following applies:

xInti=Clip3(SubPicLeftBoundaryPos, SubPicRightBoundaryPos, xIntL+$i$), and yInti=Clip3(SubPicTopBoundaryPos, SubPicBotBoundaryPos, yIntL+$i$), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$\text{Clip3}(x, y, z) = \begin{cases} x; & z < x \\ y; & z > y \\ z; & \text{otherwise} \end{cases}$$

where x, y, and z are numerical input values.

Optionally, in any of the preceding aspects, another implementation of the aspect provides, wherein the interpolation filter includes a luma sample eight tap interpolation filtering process, wherein the block includes a block of luma samples, and wherein the predicted sample value includes a predicted luma sample value.

Optionally, in any of the preceding aspects, another implementation of the aspect provides, wherein the luma sample eight tap interpolation filtering process receives inputs including a luma location in full sample units (xIntL, yIntL), wherein the luma sample bilinear interpolation process outputs a predicted luma sample value (predSampleLXL), and wherein the clipping function is applied to the sample locations according to: when subpic_treated_as_pic_flag[SubPicIdx] is equal to one, the following applies:

xInti=Clip3(SubPicLeftBoundaryPos, SubPicRightBoundaryPos, xIntL+i−3), and yInti=Clip3(SubPicTopBoundaryPos, SubPicBotBoundaryPos, yIntL+i−3), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$\text{Clip3}(x, y, z) = \begin{cases} x; & z < x \\ y; & z > y \\ z; & \text{otherwise} \end{cases}$$

where x, y, and z are numerical input values.

Optionally, in any of the preceding aspects, another implementation of the aspect provides, wherein the interpolation filter includes a chroma sample interpolation process, wherein the block includes a block of chroma samples, and wherein the predicted sample value includes a predicted chroma sample value.

Optionally, in any of the preceding aspects, another implementation of the aspect provides, wherein the chroma sample interpolation process receives inputs including a chroma location in full sample units (xIntC, yIntC), wherein the chroma sample interpolation process outputs a predicted chroma sample value (predSampleLXC), and wherein the clipping function is applied to the sample locations according to: when subpic_treated_as_pic_flag[SubPicIdx] is equal to one, the following applies:

xInti=Clip3(SubPicLeftBoundaryPos/SubWidthC, SubPicRightBoundaryPos/SubWidthC, xIntC+i), and yInti=Clip3(SubPicTopBoundaryPos/SubHeightC, SubPicBotBoundaryPos/SubHeightC, yIntC+i), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, SubWidthC and SubHeightC indicate a horizontal and vertical sampling rate ratio between luma and chroma samples, and Clip3 is the clipping function according to:

$$\text{Clip3}(x, y, z) = \begin{cases} x; & z < x \\ y; & z > y \\ z; & \text{otherwise} \end{cases}$$

where x, y, and z are numerical input values.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a current picture including a sub-picture coded according to inter-prediction; a determining means for determining a motion vector for a block of the sub-picture; an applying means for: applying a clipping function to sample locations in a reference block to support application of an interpolation filter when the motion vector points outside of the sub-picture and when a flag is set to indicate the sub-picture is treated as a picture; and applying the interpolation filter to results of the clipping function to obtain a predicted sample value; a decoding means for decoding the block based on the predicted sample value; and a forwarding means for forwarding the block for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: a partitioning means for partitioning a current picture into a sub-picture and the sub-picture into a block; a determining means for determining to encode the block according to inter-prediction; a selecting means for selecting a motion vector to encode the block; an applying means for: applying a clipping function to sample locations in a reference block to support application of an interpolation filter when the motion vector points outside of the sub-picture and when a flag is set to indicate the sub-picture is treated as a picture; and applying the interpolation filter to results of the clipping function to obtain a predicted sample value; an encoding means for encoding the block into a bitstream based on the predicted sample value and the motion vector; and a storing means for storing the bitstream for communication toward a decoder.

Optionally, in any of the preceding aspects, another implementation of the aspect provides, wherein the encoder is further configured to perform the method of any of the preceding aspects.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
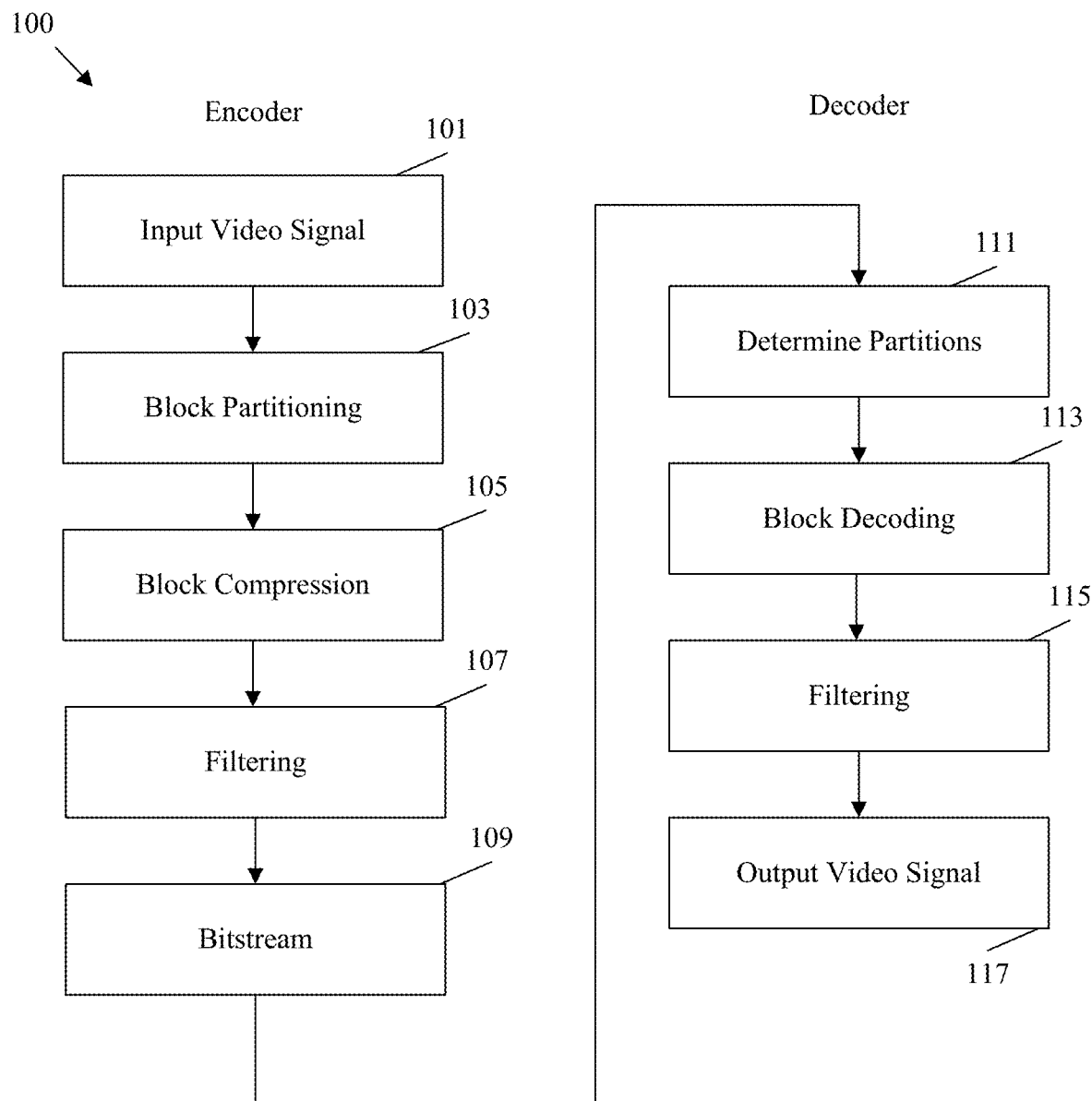
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms are used herein, Adaptive Loop Filter (ALF), Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Raw Byte Sequence Payload (RBSP), Sample Adaptive Offset (SAO), Sequence Parameter Set (SPS), Temporal Motion Vector Prediction (TMVP), Versatile Video Coding (VVC), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain.

These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-M1001-v6 which provides an algorithm description, an encoder-side description of the VVC WD, and reference software.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

A tile is a partitioned portion of an image created by horizontal and vertical boundaries that create columns and rows of tiles. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. Temporal MCTSs supplemental enhancement information (SEI) messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for an MCTS set. The information includes a number of extraction information sets, each defining a number of MCTS sets and containing raw bytes sequence payload (RBSP) bytes of the replacement video parameter set (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) may be rewritten or replaced, and slice headers may updated because one or all of the slice address related syntax elements (including first_slice_segment_in_pic_flag and slice_segment_address) may employ different values in the extracted sub-bitstream.

Pictures may also be partitioned into one or more sub-pictures. Partitioning a picture into a sub-picture may allow different portions of a picture to be treated differently from a coding standpoint. For example, a sub-picture can be extracted and displayed without extracting the other sub-pictures. As another example, different sub-pictures can be displayed at different resolutions, repositioned relative to each other (e.g., in teleconferencing applications), or otherwise coded as separate pictures even though the sub-pictures collectively contain data from a common picture.

An example implementation of sub-pictures is as follows. A picture can be partitioned into one or more sub-pictures. A sub-picture is a rectangular or square set of slices/tile groups that begin with a slice/tile group that has an address equal to zero. Each sub-picture may refer to a different PPS, and hence each sub-picture may employ a different partitioning mechanism. Sub-pictures may be treated like pictures in the decoding process. A current reference picture used for decoding a current sub-picture may be generated by extracting an area collocating with the current sub-picture from the reference pictures in the decoded picture buffer. The extracted area may be a decoded sub-picture, and hence inter-prediction may take place between sub-pictures of the same size and the same location within the picture. A tile group may be a sequence of tiles in tile raster scan of a sub-picture. The following may be derived to determine the location of a sub-picture in a picture. Each sub-picture may be included in the next unoccupied location in CTU raster scan order within a picture that is large enough to fit the sub-picture within the picture boundaries.

The sub-picture schemes employed by various video coding systems include various problems that reduce coding efficiency and/or functionality. The present disclosure includes various solutions to such problems. In a first example problem, inter-prediction may be performed according to one of several inter-prediction modes. Certain inter-prediction modes generate candidate lists of motion vector predictors at both the encoder and the decoder. This allows the encoder to signal a motion vector by signaling the index from the candidate list instead of signaling the entire motion vector. Further, some systems encode sub-pictures for independent extraction. This allows a current sub-picture to be decoded and displayed without decoding information from other sub-pictures. This may cause errors when a motion vector is employed that points outside of the sub-picture because the data pointed to by the motion vector may not be decoded and hence may not be available.

Accordingly, in a first example, disclosed herein is a flag that indicates a sub-picture should be treated as a picture. This flag is set to support separate extraction of the sub-picture. When the flag is set, the motion vector predictors obtained from a collocated block include only motion vectors that point inside the sub-picture. Any motion vector predictors that point outside of the sub-picture are excluded. This ensures that motion vectors that point outside of the sub-picture are not selected and associated errors are avoided. A collocated block is a block from a different picture from the current picture. Motion vector predictors from blocks in the current picture (non-collocated blocks) may point outside of the sub-picture because other processes, such as interpolation filters, may prevent errors for such motion vector predictors. Accordingly, the present example provides additional functionality to a video encoder/decoder (codec) by preventing errors when performing sub-picture extraction.

In a second example, disclosed herein is a flag that indicates a sub-picture should be treated as a picture. When a current sub-picture is treated like a picture, the current sub-picture should be extracted without reference to other sub-pictures. Specifically, the present example employs a clipping function that is applied when applying interpolation filters. This clipping function ensures that the interpolation filter does not rely on data from adjacent sub-pictures in order to maintain separation between the sub-pictures to support separate extraction. As such, the clipping function is applied when the flag is set and a motion vector points outside of the current sub-picture. The interpolation filter is then applied to the results of the clipping function. Accordingly, the present example provides additional functionality to a video codec by preventing errors when performing sub-picture extraction. As such, the first example and the second example address the first example problem.

In a second example problem, video coding systems partition pictures into sub-pictures, slices, tiles, and/or coding tree units, which are then partitioned into blocks. Such blocks are then encoded for transmission toward a decoder. Decoding such blocks may result in a decoded image that contains various types of noise. To correct such issues, video coding systems may apply various filters across block boundaries. These filters can remove blocking, quantization noise, and other undesirable coding artifacts. As noted above, some systems encode sub-pictures for independent extraction. This allows a current sub-picture to be decoded and displayed without decoding information from other sub-pictures. In such systems, the sub-picture may be partitioned into blocks for encoding. As such, block boundaries along the sub-picture edge may align with sub-picture boundaries. In some cases, the block boundaries may also align with tile boundaries. Filters may be applied across such block boundaries, and hence applied across sub-picture boundaries and/or tile boundaries. This may cause errors when a current sub-picture is independently extracted as the filtering process may operate in an unexpected manner when data from an adjacent sub-picture is unavailable.

In a third example, disclosed herein is a flag that controls filtering at the sub-picture level. When the flag is set for a sub-picture, filters can be applied across the sub-picture boundary. When the flag is not set, filters are not applied across the sub-picture boundary. In this way, the filters can be turned off for sub-pictures that are encoded for separate extraction or turned on for sub-pictures that are encoded for display as a group. As such, the present example provides additional functionality to a video codec by preventing filter related errors when performing sub-picture extraction.

In a fourth example, disclosed herein is a flag that can be set to control filtering at the tile level. When the flag is set for a tile, filters can be applied across the tile boundary. When the flag is not set, filters are not applied across the tile boundary. In this way, the filters can be turned off or on for use at tile boundaries (e.g., while continuing to filter the internal portions of the tile). Accordingly, the present example provides additional functionality to a video codec by supporting selective filtering across tile boundaries. As such, the third example and the fourth example address the second example problem.

In a third example problem, video coding systems may partition a picture into sub-pictures. This allows different sub-pictures to be treated differently when coding the video. For example, sub-pictures can be separately extracted and displayed, resized independently based on application level changes, etc. In some cases, sub-pictures may be created by partitioning a picture into tiles and assigning the tiles to the sub-pictures. Some video coding systems describe the sub-picture boundaries in terms of the tiles included in the sub-picture. However, tiling schemes may not be employed in some pictures. Accordingly, such boundary descriptions may limit usage of sub-pictures to pictures employing tiles.

In a fifth example, disclosed herein is a mechanism for signaling sub-picture boundaries in terms of CTBs and/or CTUs. Specifically, the width and height of a sub-picture can be signaled in units of CTBs. Also, the position of the top left CTU of the sub-picture can be signaled as an offset from the top left CTU of the picture as measured in CTBs. CTU and CTB sizes may be set to a predetermined value. Accordingly, signaling the sub-picture dimensions and position in terms of CTBs and CTUs provides sufficient information for a decoder to position the sub-picture for display. This allows sub-pictures to be employed even when tiles are not employed. Also, this signaling mechanism both avoids complexity and can be coded using relatively few bits. As such, the present example provides additional functionality to a video codec by allowing sub-pictures to be employed independently of tiles. Further, the present example increases coding efficiency, and hence reduces usage of processor, memory, and/or network resources at the encoder and/or decoder. As such, the fifth example addresses the third example problem.

In a fourth example problem, a picture can be partitioned into a plurality of slices for encoding. In some video coding systems, the slices are addressed based on their position relative to the picture. Still other video coding systems employ the concept of sub-pictures. As noted above, a sub-picture can be treated differently from other sub-pictures from a coding perspective. For example, a sub-picture can be extracted and displayed independently of other sub-pictures. In such a case, the slice addresses that are generated based on picture position may cease to operate properly as a significant number of the expected slice addresses are omitted. Some video coding systems address this issue by dynamically rewriting slice headers upon request to change slice addresses to support sub-picture extraction. Such a process can be resource intensive, as this process may occur each time a user requests to view the sub-picture.

In a sixth example, disclosed herein are slices that are addressed relative to the sub-picture that contains the slice. For example, the slice header may include a sub-picture identifier (ID) and an address of each slice included in the sub-picture. Further, a sequence parameter set (SPS) may contain dimensions of the sub-picture that may be referenced by the sub-picture ID. Accordingly, the slice header need not be rewritten when separate extraction of the sub-picture is requested. The slice header and SPS contain sufficient information to support positioning the slices in the sub-picture for display. As such, the present example increases coding efficiency and/or avoids redundant rewriting of the slice header, and hence reduces usage of processor, memory, and/or network resources at the encoder and/or decoder. Accordingly, the sixth example addresses the fourth example problem.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and case of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
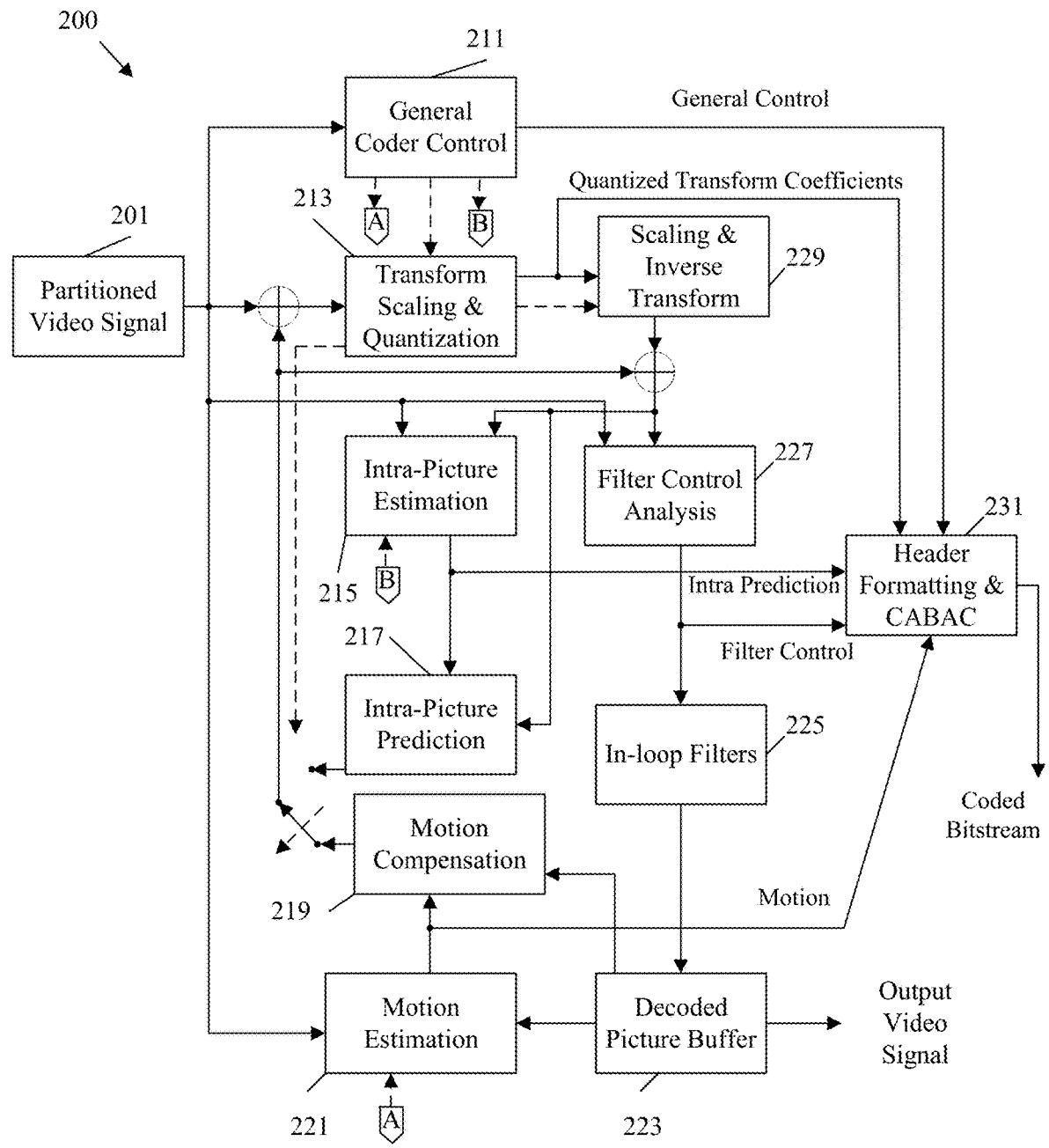
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
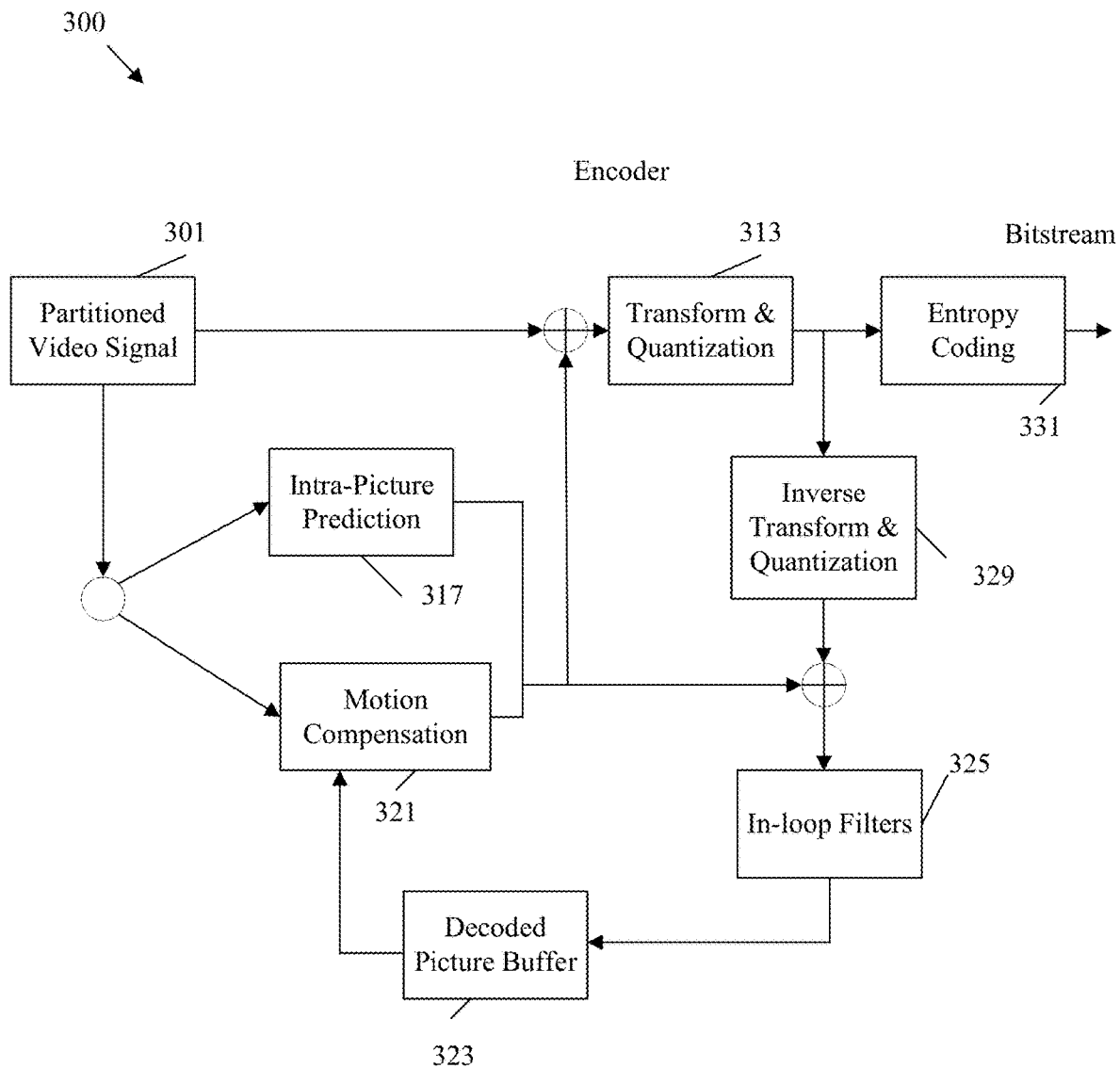
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
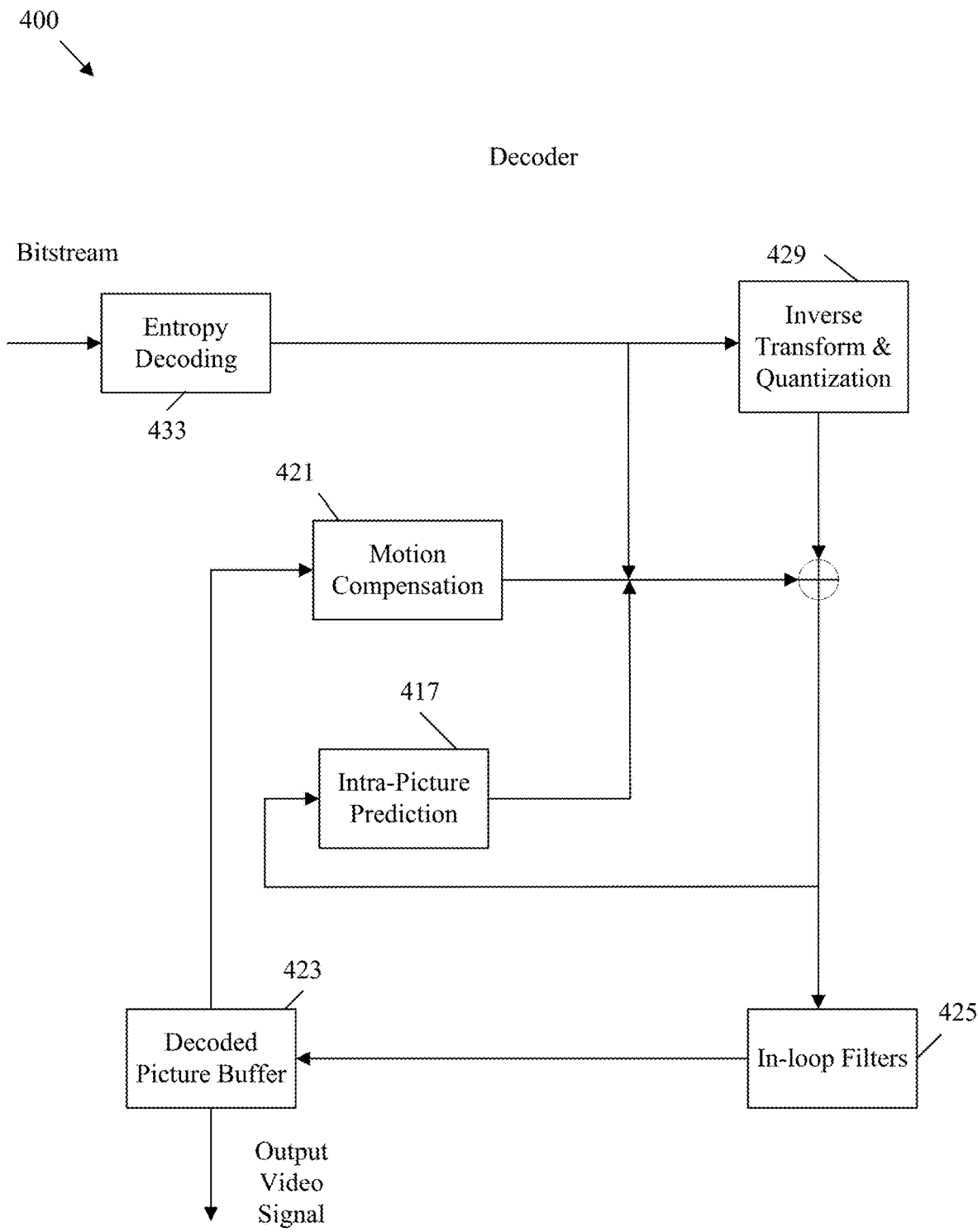
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5A:
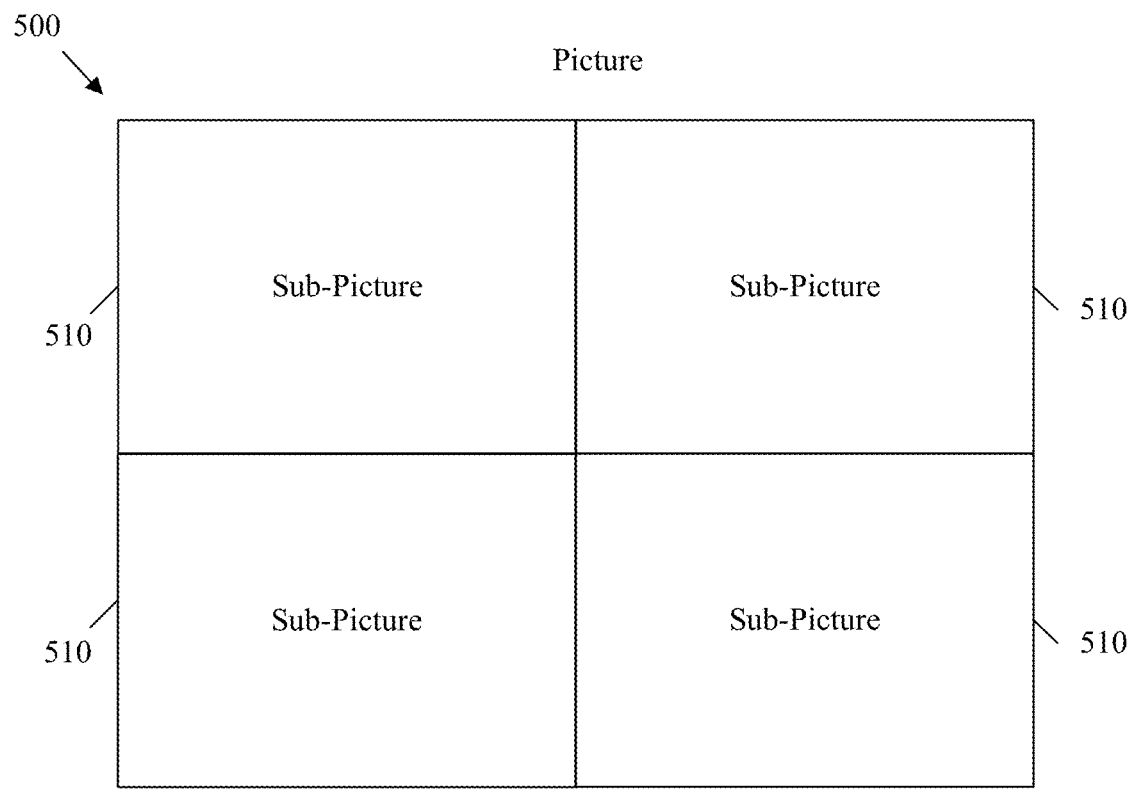
FIG. 5A is a schematic diagram illustrating an example picture partitioned into sub-pictures.

FIG. 5A is a schematic diagram illustrating an example picture 500 partitioned into sub-pictures 510. For example, the picture 500 can be partitioned for encoding by a codec system 200 and/or an encoder 300 and partitioned for decoding by a codec system 200 and/or a decoder 400. As another example, the picture 500 may be partitioned by an encoder at step 103 of method 100 for use by a decoder at step 111.

A picture 500 is an image depicting the complete visual portion of a video sequence at a specified temporal location. The picture 500 may also be referred to as an image and/or a frame. A picture 500 may be specified by a picture order count (POC). The POC is an index that indicates the output/display order of the pictures 500 in a video sequence. The picture 500 can be partitioned into sub-pictures 510. A sub-picture 510 is a rectangular or square region of one or more slices/tile groups within a picture 500. Sub-pictures 510 are optional, and hence some video sequences contain sub-pictures 510 while others do not. While four sub-pictures 510 are depicted, the picture 500 can be partitioned into any number of sub-pictures 510. The partitioning of the sub-picture 510 may be consistent over an entire coded video sequence (CVS).

Sub-pictures 510 may be employed to allow different regions of a picture 500 to be treated differently. For example, a specified sub-picture 510 may be independently extracted and transmitted to a decoder. As a specific example, a user employing a virtual reality (VR) headset may see a sub-set of the picture 500, which may provide the user with the impression of being physically present in a space as depicted in the picture 500. In such a case, streaming only the sub-pictures 510 that are likely to be displayed to the user may increase coding efficiency. As another example, different sub-pictures 510 may be treated differently in certain applications. As a specific example, a teleconferencing application may display an active speaker at higher resolution in a more prominent position than users that are not currently speaking. Positioning different users in different sub-pictures 510 supports real time reconfiguring of the displayed image to support this functionality.

Each sub-picture 510 can be identified by a unique sub-picture ID, which may be consistent for the entire CVS. For example, the sub-picture 510 at the top left of the picture 500 may have a sub-picture ID of zero. In such a case, the top left sub-picture 510 of any picture 500 in the sequence can be referred to by the sub-picture ID of zero. Further, each sub-picture 510 may include a defined configuration, which may be consistent for the entire CVS. For example, a sub-picture 510 may contain a height, a width, and/or an offset. The height and width describe the size of the sub-picture 510 and the offset describes the location of the sub-picture 510. For example, the sum of the widths of all of the sub-pictures 510 in a row is the width of the picture 500. Further, the sum of the heights of all of the sub-pictures 510 in a column is the height of the picture 500. In addition, the offset indicates the position of the top left corner of the sub-picture 510 relative to the top left corner of the picture 500. The height, width, and offset of a sub-picture 510 provide sufficient information to position the corresponding sub-picture 510 in the picture 500. Since the partitioning of sub-pictures 510 may be consistent over an entire CVS, the parameters related to sub-pictures may be contained in a sequence parameter set (SPS).

Figure 5B:
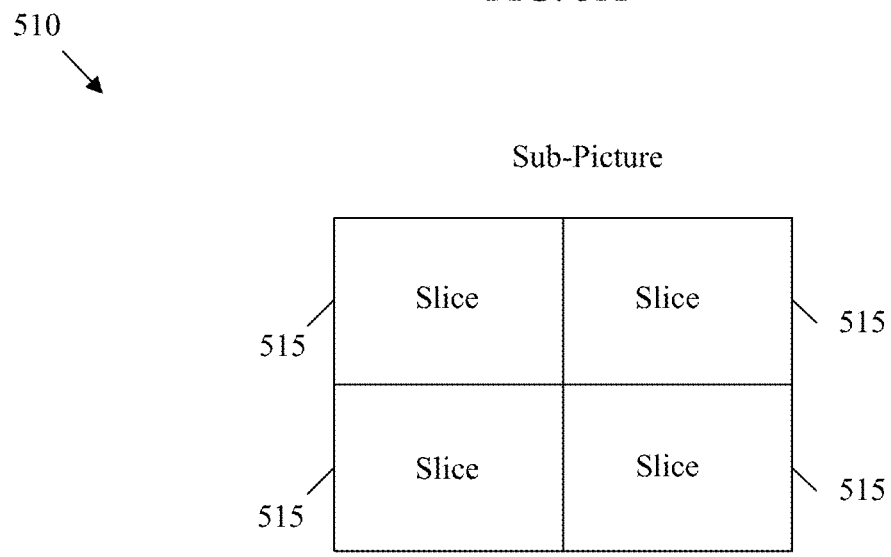
FIG. 5B is a schematic diagram illustrating an example sub-picture partitioned into slices.

FIG. 5B is a schematic diagram illustrating an example sub-picture 510 partitioned into slices 515. As shown, sub-picture 510 of a picture 500 may contain one or more slices 515. A slice 515 is an integer number of complete tiles or an integer number of consecutive complete CTU rows within a tile of a picture that are exclusively contained in a single network abstraction layer (NAL) unit. While four slices 515 are depicted, the sub-picture 510 may include any number of slices 515. The slices 515 contain visual data that is specific to a picture 500 of a specified POC. Accordingly, parameters related to slices 515 may be contained in a picture parameter set (PPS) and/or a slice header.

Figure 5C:
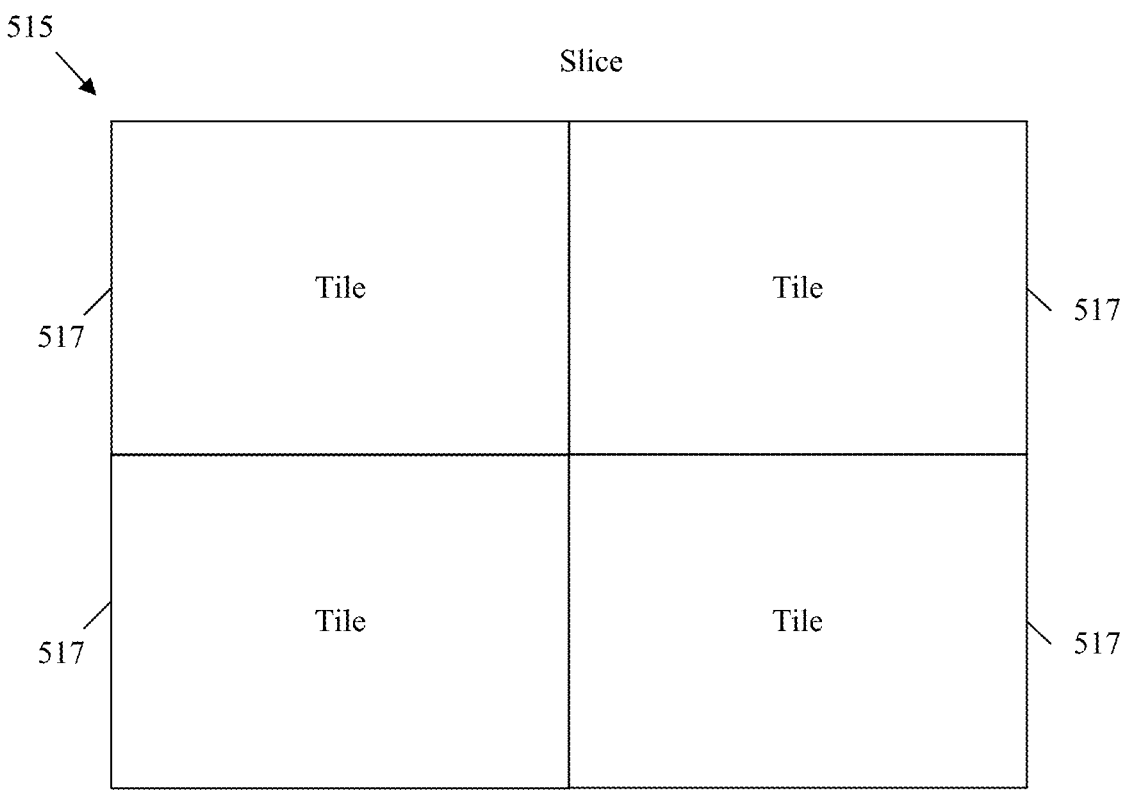
FIG. 5C is a schematic diagram illustrating an example slice partitioned into tiles.

FIG. 5C is a schematic diagram illustrating an example slice 515 partitioned into tiles 517. As shown, slice 515 of a picture 500 may contain one or more tiles 517. Tiles 517 may be created by partitioning the picture 500 into rows and columns of rectangles. Accordingly, a tile 517 is a rectangular or square region of CTUs within a particular tile column and a particular tile row in a picture. Tiling is optional, and hence some video sequences contain tiles 517 while others do not. While four tiles 517 are depicted, the slice 515 may include any number of tiles 517. The tiles 517 may contain visual data that is specific to a slice 515 of a picture 500 of a specified POC. In some cases, slices 515 may also be contained in tiles 517. Accordingly, parameters related to tiles 517 may be contained in a PPS and/or a slice header.

Figure 5D:
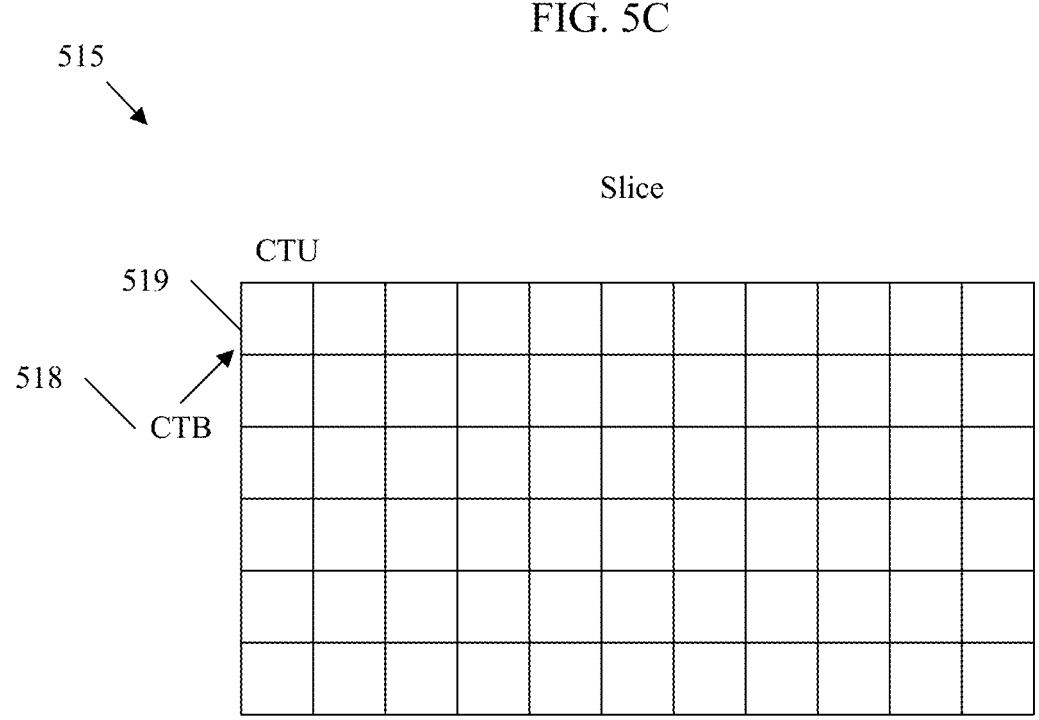
FIG. 5D is a schematic diagram illustrating an example slice partitioned into coding tree units (CTUs).

FIG. 5D is a schematic diagram illustrating an example slice 515 partitioned into CTUs 519. As shown, slice 515 (or a tile 517 of a slice 515) of a picture 500 may contain one or more CTUs 519. A CTU 519 is a region of the picture 500 that is sub-divided by a coding tree to create coding blocks, which are encoded/decoded. A CTU 519 may contain luma samples for a monochrome picture 500 or a combination of luma and chroma samples for a color picture 500. A grouping of luma samples or chroma samples that can be partitioned by a coding tree is referred to as a coding tree block (CTB) 518. As such, a CTU 519 contains a CTB 518 of luma samples and two corresponding CTBs 518 of chroma samples of a picture 500 that has three sample arrays, or contains a CTB 518 of samples of a monochrome picture or a picture that is coded using three separate color planes and syntax structures used to code the samples.

As shown above, a picture 500 may be partitioned into sub-pictures 510, slices 515, tiles 517, CTUs 519, and/or CTBs 518, which are then partitioned into blocks. Such blocks are then encoded for transmission toward a decoder. Decoding such blocks may result in a decoded image that contains various types of noise. To correct such issues, video coding systems may apply various filters across block boundaries. These filters can remove blocking, quantization noise, and other undesirable coding artifacts. As noted above, the sub-pictures 510 may be employed when performing independent extraction. In this case, a current sub-picture 510 may be decoded and displayed without decoding information from other sub-pictures 510. As such, block boundaries along the sub-picture 510 edge may align with sub-picture boundaries. In some cases, the block boundaries may also align with tile boundaries. Filters may be applied across such block boundaries, and hence applied across sub-picture boundaries and/or tile boundaries. This may cause errors when a current sub-picture 510 is independently extracted as the filtering process may operate in an unexpected manner when data from an adjacent sub-picture 510 is unavailable.

In order to address these issues a flag may be employed that controls filtering at the sub-picture 510 level. For example, the flag may be denoted as a loop_filter_across_subpic_enabled_flag. When the flag is set for a sub-picture 510, filters can be applied across the corresponding sub-picture boundary. When the flag is not set, filters are not applied across the corresponding sub-picture boundary. In this way, the filters can be turned off for sub-pictures 510 that are encoded for separate extraction or turned on for sub-pictures 510 that are encoded for display as a group. Another flag can be set to control filtering at the tile 517 level. The flag may be denoted as a loop_filter_across_tiles_enabled_flag. When the flag is set for a tile 517, filters can be applied across the tile boundary. When the flag is not set, filters are not applied across the tile boundary. In this way, the filters can be turned off or on for use at tile boundaries (e.g., while continuing to filter the internal portions of the tile). As used herein, a filter is applied across a sub-picture 510 or a tile 517 boundary when the filter is applied to samples on both sides of the boundary.

Also as noted above, tiling is optional. However, some video coding systems describe the sub-picture boundaries in terms of the tiles 517 included in the sub-picture 510. In such systems, sub-picture boundary descriptions in terms of tiles 517 limit the usage of sub-pictures 510 to pictures 500 that employ tiles 517. In order to broaden the applicability of sub-pictures 510, the sub-pictures 510 may be described in terms of boundaries, in terms of CTBs 518, and/or CTUs 519. Specifically, the width and height of a sub-picture 510 can be signaled in units of CTBs 518. Further, the position of the top left CTU 519 of the sub-picture 510 can be signaled as an offset from the top left CTU 519 of the picture 500 as measured in CTBs 518. CTU 519 and CTB 518 sizes may be set to a predetermined value. Accordingly, signaling the sub-picture dimensions and position in terms of CTBs 518 and CTUs 519 provides sufficient information for a decoder to position the sub-picture 510 for display. This allows sub-pictures 510 to be employed even when tiles 517 are not employed.

In addition, some video coding systems address slices 515 based on their position relative to the picture 500. This creates a problem when sub-pictures 510 are coded for independent extraction and display. In such a case, slices 515 and corresponding addresses associated with the omitted sub-pictures 510 are also omitted. The omission of the addresses of the slices 515 may prevent the decoder from properly positioning the slices 515. Some video coding systems address this issue by dynamically rewriting the addresses in the slice headers associated with the slices 515. Since the user may request any sub-picture, such rewriting occurs each time a user requests the video, which is extremely resource intensive. In order to overcome this issue, the slices 515 are addressed relative to the sub-picture 510 that contains the slice 515 when sub-pictures 510 are employed. For example, the slice 515 can be identified by an index or other value that is specific to the sub-picture 510 that contains the slice 515. The slice address can be coded into the slice header associated with the slice 515. The sub-picture ID of the sub-picture 510 that contains the slice 515 can also be encoded in a slice header. Further, the dimensions/configuration of the sub-picture 510 can be coded into the SPS along with the sub-picture ID. As such, the decoder can obtain the sub-picture 510 configuration from the SPS based on the sub-picture ID and position the slice 515 into the sub-picture 510 without referencing the complete picture 500. As such, slice header rewriting can be omitted when a sub-picture 510 is extracted, which significantly reduces resource usage at the encoder, the decoder, and/or a corresponding slicer.

Once a picture 500 is partitioned into CTBs 518 and/or CTUs 519, the CTBs 518 and/or CTUs 519 can be further split into coding blocks. The coding blocks can then be coded according to intra-prediction and/or inter-prediction. The present disclosure also includes improvements related to the inter-prediction mechanisms. Inter-prediction can be performed in several different modes that can operate according to unidirectional inter-prediction and/or bidirectional inter-prediction.

Figure 6:
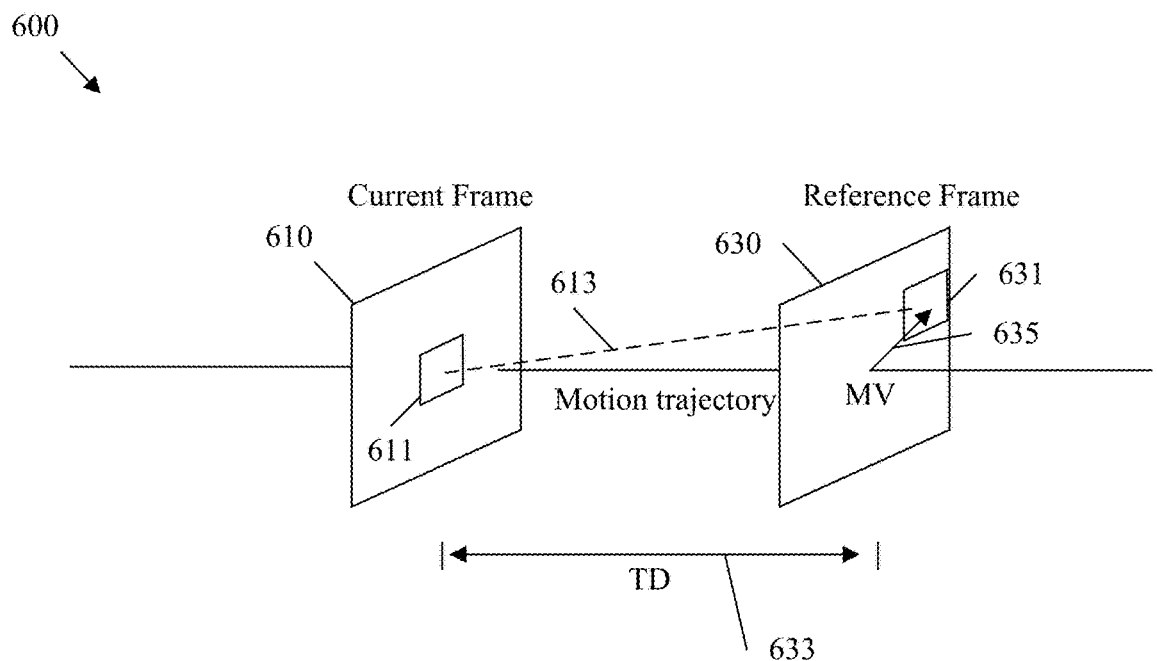
FIG. 6 is a schematic diagram illustrating an example of unidirectional inter-prediction.

FIG. 6 is a schematic diagram illustrating an example of unidirectional inter-prediction 600, for example as performed to determine motion vectors (MVs) at block compression step 105, block decoding step 113, motion estimation component 221, motion compensation component 219, motion compensation component 321, and/or motion compensation component 421. For example, unidirectional inter-prediction 600 can be employed to determine motion vectors for encoded and/or decoding blocks created when partitioning a picture, such as picture 500.

Unidirectional inter-prediction 600 employs a reference frame 630 with a reference block 631 to predict a current block 611 in a current frame 610. The reference frame 630 may be temporally positioned after the current frame 610 as shown (e.g., as a subsequent reference frame), but may also be temporally positioned before the current frame 610 (e.g., as a preceding reference frame) in some examples. The current frame 610 is an example frame/picture being encoded/decoded at a particular time. The current frame 610 contains an object in the current block 611 that matches an object in the reference block 631 of the reference frame 630. The reference frame 630 is a frame that is employed as a reference for encoding a current frame 610, and a reference block 631 is a block in the reference frame 630 that contains an object also contained in the current block 611 of the current frame 610.

The current block 611 is any coding unit that is being encoded/decoded at a specified point in the coding process. The current block 611 may be an entire partitioned block, or may be a sub-block when employing affine inter-prediction mode. The current frame 610 is separated from the reference frame 630 by some temporal distance (TD) 633. The TD 633 indicates an amount of time between the current frame 610 and the reference frame 630 in a video sequence, and may be measured in units of frames. The prediction information for the current block 611 may reference the reference frame 630 and/or reference block 631 by a reference index indicating the direction and temporal distance between the frames. Over the time period represented by the TD 633, the object in the current block 611 moves from a position in the current frame 610 to another position in the reference frame 630 (e.g., the position of the reference block 631). For example, the object may move along a motion trajectory 613, which is a direction of movement of an object over time. A motion vector 635 describes the direction and magnitude of the movement of the object along the motion trajectory 613 over the TD 633. Accordingly, an encoded motion vector 635, a reference block 631, and a residual including the difference between the current block 611 and the reference block 631 provides information sufficient to reconstruct a current block 611 and position the current block 611 in the current frame 610.

Figure 7:
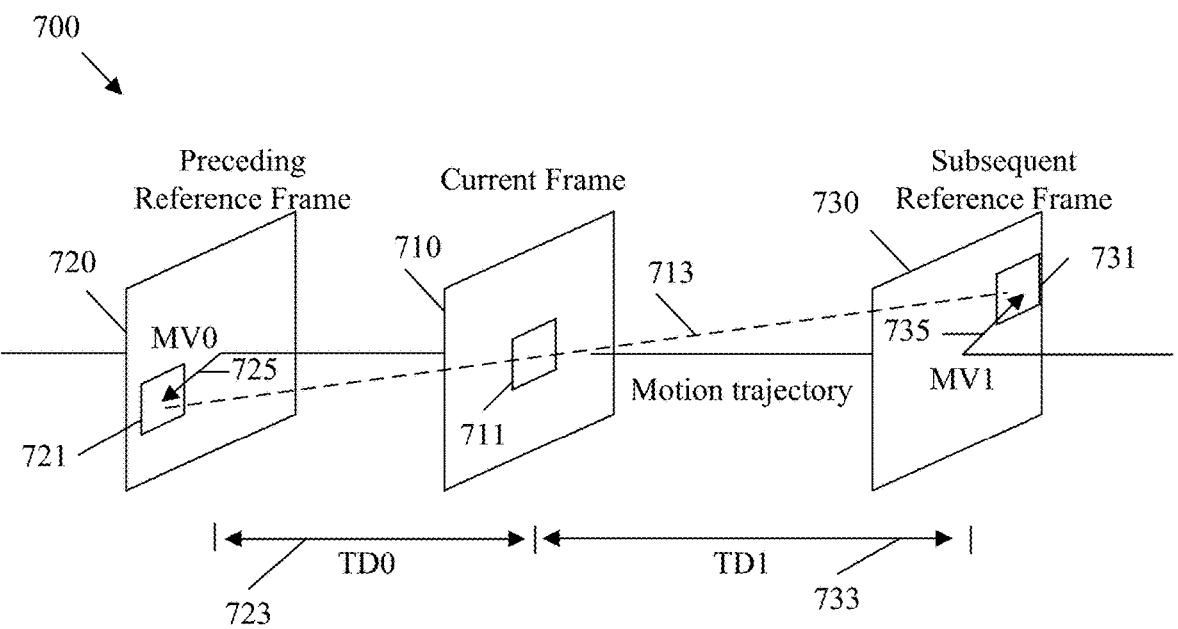
FIG. 7 is a schematic diagram illustrating an example of bidirectional inter-prediction.

FIG. 7 is a schematic diagram illustrating an example of bidirectional inter-prediction 700, for example as performed to determine MVs at block compression step 105, block decoding step 113, motion estimation component 221, motion compensation component 219, motion compensation component 321, and/or motion compensation component 421. For example, bidirectional inter-prediction 700 can be employed to determine motion vectors for encoded and/or decoding blocks created when partitioning a picture, such as picture 500.

Bidirectional inter-prediction 700 is similar to unidirectional inter-prediction 600, but employs a pair of reference frames to predict a current block 711 in a current frame 710. Hence current frame 710 and current block 711 are substantially similar to current frame 610 and current block 611, respectively. The current frame 710 is temporally positioned between a preceding reference frame 720, which occurs before the current frame 710 in the video sequence, and a subsequent reference frame 730, which occurs after the current frame 710 in the video sequence. Preceding reference frame 720 and subsequent reference frame 730 are otherwise substantially similar to reference frame 630.

The current block 711 is matched to a preceding reference block 721 in the preceding reference frame 720 and to a subsequent reference block 731 in the subsequent reference frame 730. Such a match indicates that, over the course of the video sequence, an object moves from a position at the preceding reference block 721 to a position at the subsequent reference block 731 along a motion trajectory 713 and via the current block 711. The current frame 710 is separated from the preceding reference frame 720 by some preceding temporal distance (TD0) 723 and separated from the subsequent reference frame 730 by some subsequent temporal distance (TD1) 733. The TD0 723 indicates an amount of time between the preceding reference frame 720 and the current frame 710 in the video sequence in units of frames. The TD1 733 indicates an amount of time between the current frame 710 and the subsequent reference frame 730 in the video sequence in units of frame. Hence, the object moves from the preceding reference block 721 to the current block 711 along the motion trajectory 713 over a time period indicated by TD0 723. The object also moves from the current block 711 to the subsequent reference block 731 along the motion trajectory 713 over a time period indicated by TD1 733. The prediction information for the current block 711 may reference the preceding reference frame 720 and/or preceding reference block 721 and the subsequent reference frame 730 and/or subsequent reference block 731 by a pair of reference indices indicating the direction and temporal distance between the frames.

A preceding motion vector (MV0) 725 describes the direction and magnitude of the movement of the object along the motion trajectory 713 over the TD0 723 (e.g., between the preceding reference frame 720 and the current frame 710). A subsequent motion vector (MV1) 735 describes the direction and magnitude of the movement of the object along the motion trajectory 713 over the TD1 733 (e.g., between the current frame 710 and the subsequent reference frame 730). As such, in bidirectional inter-prediction 700, the current block 711 can be coded and reconstructed by employing the preceding reference block 721 and/or the subsequent reference block 731, MV0 725, and MV1 735.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter-prediction 600, bidirectional inter-prediction 700, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter-prediction 600 and/or bidirectional inter-prediction 700, depending on which approach is used when such neighboring blocks are encoded.

Figure 8:
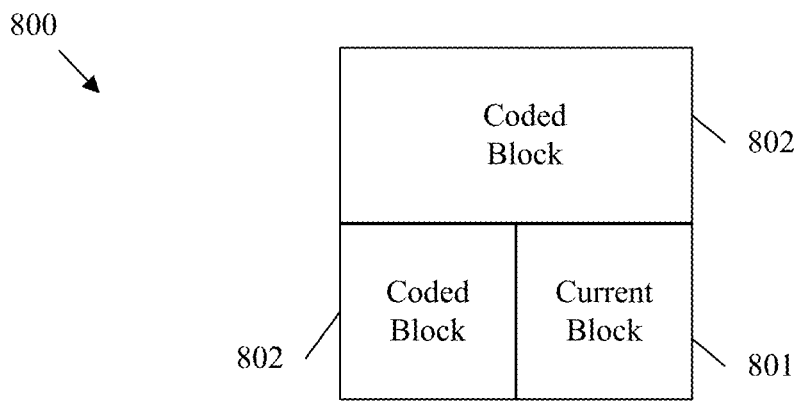
FIG. 8 is a schematic diagram illustrating an example of coding a current block based on candidate motion vectors from adjacent coded blocks.

FIG. 8 is a schematic diagram illustrating an example 800 of coding a current block 801 based on candidate motion vectors from adjacent coded blocks 802. An encoder 300 and/or a decoder 400 operating method 100 and/or employing the functionality of codec system 200 can employ the adjacent blocks 802 to generate a candidate list. Such a candidate list can be employed in inter-prediction according to unidirectional inter-prediction 600 and/or bidirectional inter-prediction 700. The candidate list can then be employed to encode/decode the current block 801, which may be generated by partitioning a picture, such as picture 500.

The current block 801 is a block being encoded at an encoder or decoded at a decoder, depending on the example, at a specified time. The coded blocks 802 are blocks that are already encoded at the specified time. Hence, the coded blocks 802 are potentially available for use when generating a candidate list. The current block 801 and the coded blocks 802 may be included in a common frame and/or may be included in a temporally adjacent frame. When the coded blocks 802 are included in a common frame with the current block 801, the coded blocks 802 contain a boundary that is immediately adjacent to (e.g., abuts) a boundary of the current block 801. When a coded block 802 is included in a temporally adjacent frame, the coded block 802 is located at the same position in the temporally adjacent frame as the position of the current block 801 in the current frame. The candidate list can be generated by adding the motion vectors from the coded blocks 802 as candidate motion vectors. The current block 801 can then be coded by selecting a candidate motion vector from the candidate list and signaling the index of the selected candidate motion vector.

Figure 9:
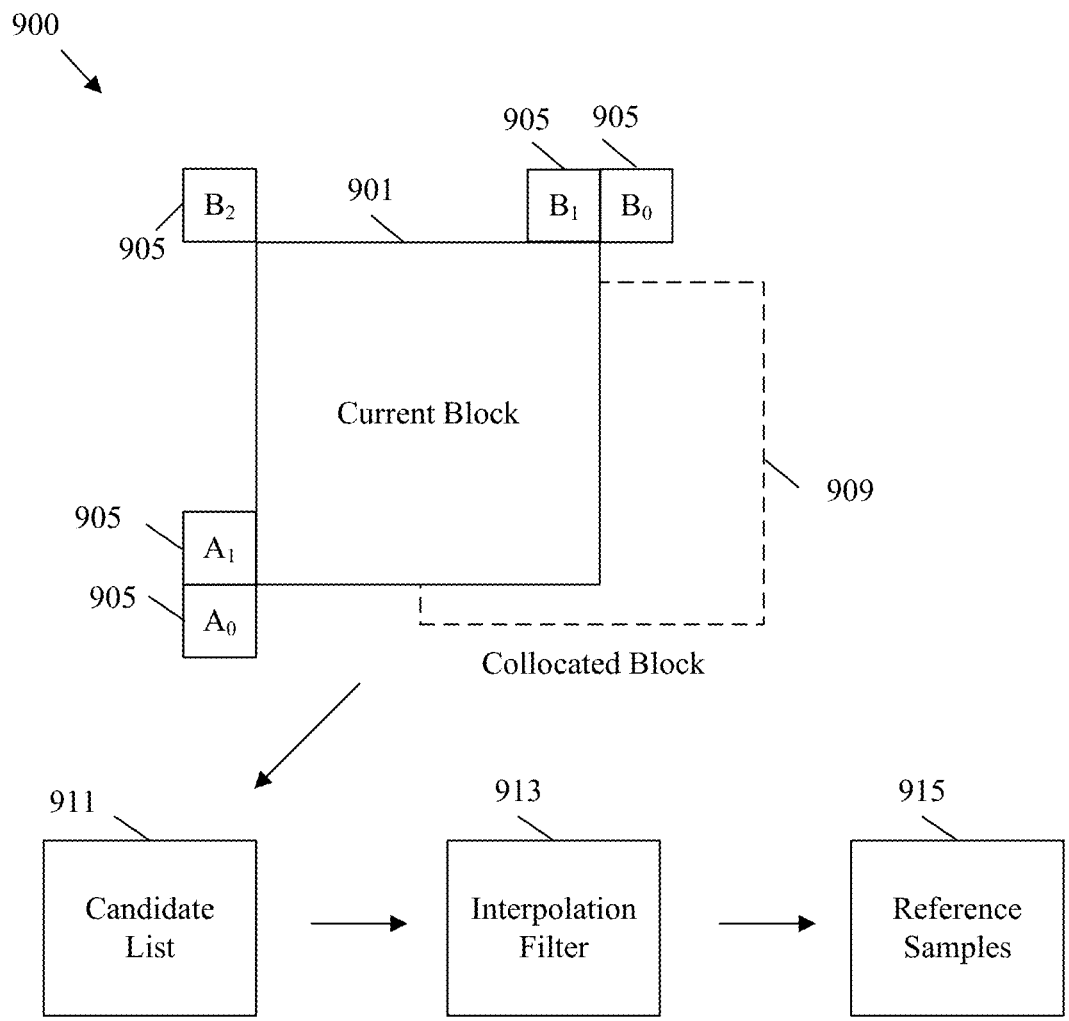
FIG. 9 is a schematic diagram illustrating an example pattern for determining a candidate list of motion vectors.

FIG. 9 is a schematic diagram illustrating an example pattern 900 for determining a candidate list of motion vectors. Specifically, an encoder 300 and/or a decoder 400 operating method 100 and/or employing the functionality of codec system 200 can employ the candidate list determination pattern 900 for use in generating a candidate list 911 for encoding a current block 801 partitioned from a picture 500. The resulting candidate list 911 may be a merge candidate list or an AMVP candidate list, which can be employed in inter-prediction according to unidirectional inter-prediction 600 and/or bidirectional inter-prediction 700.

When encoding a current block 901, the candidate list determination pattern 900 searches positions 905, denoted as A0, A1, B0, B1, and/or B2, in the same picture/frame as the current block 901 for valid candidate motion vectors. The candidate list determination pattern 900 may also search collocated block 909 for valid candidate motion vectors. The collocated block 909 is a block in the same position as the current block 901, but is included in a temporally adjacent picture/frame. The candidate motion vectors can then be positioned in a candidate list 911 in a predetermined checking order. Accordingly, the candidate list 911 is a procedurally generated list of indexed candidate motion vectors.

The candidate list 911 can be employed to select a motion vector to perform inter-prediction for the current block 901. For example, the encoder can obtain the samples of the reference blocks pointed to by the candidate motion vectors from the candidate list 911. The encoder can then select the candidate motion vector that points to the reference block that most closely matches the current block 901. The index of the selected candidate motion vector can then be encoded to represent the current block 901. In some cases, the candidate motion vector(s) point to a reference block that contains partial reference samples 915. In this case, an interpolation filter 913 can be employed to reconstruct the complete reference samples 915 to support motion vector selection. An interpolation filter 913 is a filter capable of upsampling a signal. Specifically, the interpolation filter 913 is a filter capable of accepting a partial/lower quality signal as an input and determining an approximation of a more complete/higher quality signal. As such, the interpolation filter 913 can be employed in certain cases to obtain a complete set of reference samples 915 for use in selecting the reference block for the current block 901, and hence in selecting the motion vector to encode the current block 901.

The preceding mechanisms for coding a block based on inter-prediction by using a candidate list may cause certain errors when sub-pictures, such as sub-pictures 510, are employed. Specifically, the problems may occur when a current block 901 is contained in a current sub-picture, but a motion vector points to a reference block positioned at least partially in an adjacent sub-picture. In such a case, the current sub-picture may be extracted for presentation without the adjacent sub-picture. When this occurs, the portions of the reference block in the adjacent sub-picture may not be transmitted to the decoder, and hence the reference block may not be available for decoding the current block 901. When this occurs, the decoder does not have access to sufficient data to decode the current block 901.

The present disclosure provides mechanisms to address this problem. In an example, a flag is employed that indicates the current sub-picture should be treated as a picture. This flag can be set to support separate extraction of the sub-picture. Specifically, when the flag is set, the current sub-picture should be encoded without referencing data in other sub-pictures. In this case, the current sub-picture is treated like a picture in that the current sub-picture is coded separately from other sub-pictures and can be displayed as a separate picture. Hence, this flag may be denoted as a subpic_treated_as_pic_flag[i] where i is an index of the current sub-picture. When the flag is set, the motion vector candidates (also known as motion vector predictors) obtained from a collocated block 909 include only motion vectors that point inside the current sub-picture. Any motion vector predictors that point outside of the current sub-picture are excluded from the candidate list 911. This ensures that motion vectors that point outside of the current sub-picture are not selected and associated errors are avoided. This example specifically applies to motion vectors from the collocated block 909. Motion vectors from search positions 905 in the same picture/frame may be corrected by separate mechanisms as described below.

Another example may be employed to address the search positions 905 when the current sub-picture is treated as a picture (e.g., when the subpic_treated_as_pic_flag[i] is set). When the current sub-picture is treated like a picture, the current sub-picture should be extracted without reference to other sub-pictures. The example mechanism relates to interpolation filters 913. An interpolation filter 913 can be applied to samples in one location to interpolate (e.g., predict) related samples in another location. In the present example, motion vectors from coded blocks at the search positions 905 may point to reference samples 915 outside the current sub-picture so long as interpolation filters 913 can interpolate such reference samples 915 based only on reference samples 915 from the current sub-picture. Accordingly, the present example employs a clipping function that is applied when applying interpolation filters 913 to motion vector candidates from the search positions 905 from the same picture. This clipping function clips data from the adjacent sub-pictures and hence removes such data as input to the interpolation filter 913 when determining reference samples 915 pointed to by motion vector candidates. This approach maintains separation between the sub-pictures during encoding to support separate extraction and decoding when the sub-picture is treated as a picture. The clipping function may be applied to a luma sample bilinear interpolation process, a luma sample eight tap interpolation filtering process, and/or a chroma sample interpolation process.

Figure 10:
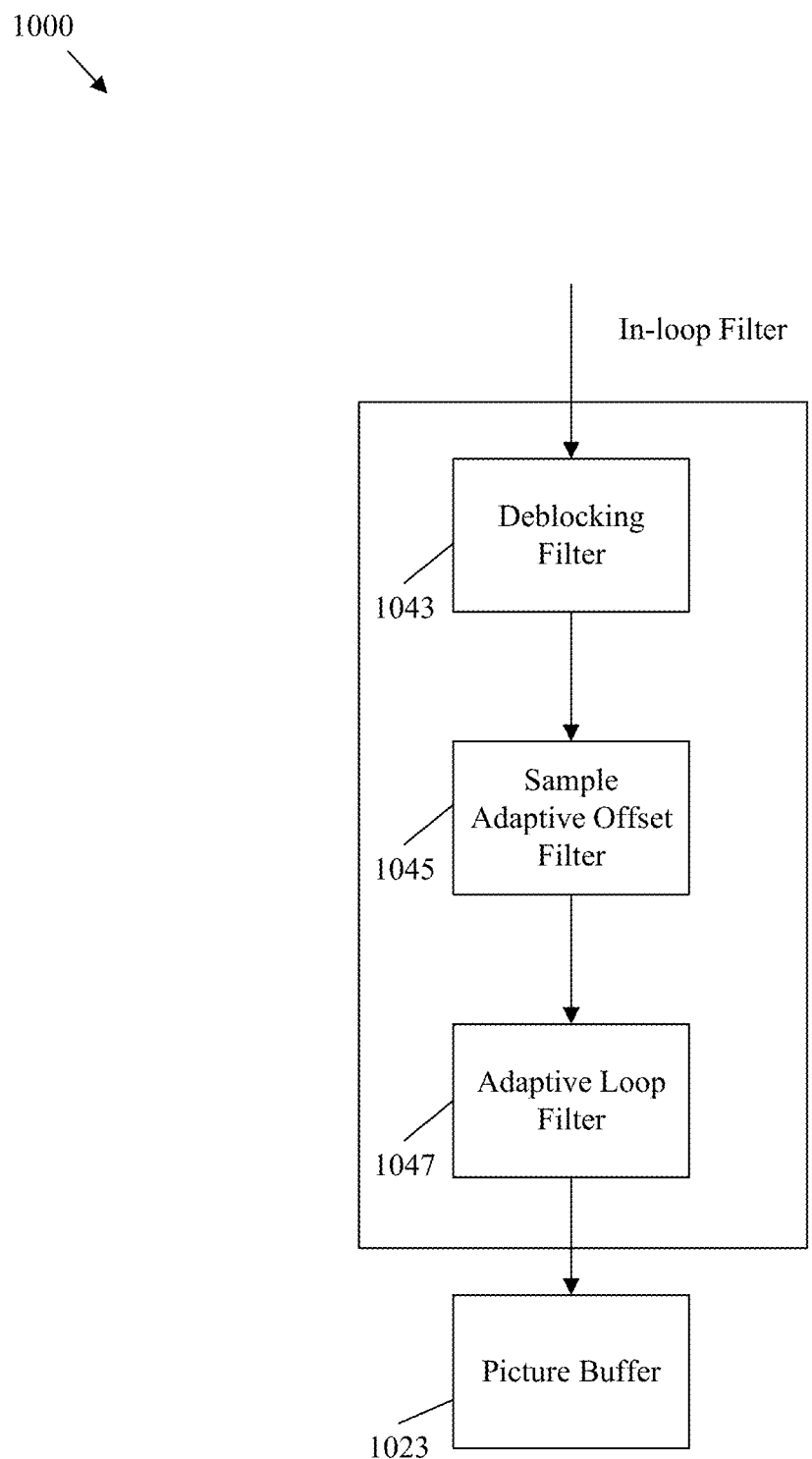
FIG. 10 is a block diagram illustrating an example in-loop filter.

FIG. 10 is a block diagram illustrating an example in-loop filter 1000. The in-loop filter 1000 may be employed to implement in-loop filters 225, 325, and/or 425. Further, the in-loop filter 1000 may be applied at the encoder and the decoder when performing method 100. In addition, the in-loop filter 1000 can be applied to filter a current block 801 partitioned from a picture 500, which may be coded according to unidirectional inter-prediction 600 and/or bidirectional inter-prediction 700 based on a candidate list generated according to pattern 900. The in-loop filter 1000 includes a deblocking filter 1043, a SAO filter 1045, and an adaptive loop filter (ALF) 1047. The filters of in-loop filter 1000 are applied in sequence to reconstructed image blocks at an encoder (e.g., prior to use as reference blocks) and at the decoder prior to display.

The deblocking filter 1043 is configured to remove block shaped edges created by block based inter and intra prediction. The deblocking filter 1043 scans an image portion (e.g., an image slice) for discontinuities in chroma and/or luma values occurring at partition boundaries. The deblocking filter 1043 then applies a smoothing function to the block boundaries to remove such discontinuities. The strength of the deblocking filter 1043 may be varied depending on the spatial activity (e.g., variance of luma/chroma components) occurring in an area adjacent to the block boundaries.

The SAO filter 1045 is configured to remove artifacts related to sample distortion caused by the encoding process. The SAO filter 1045 at an encoder classifies deblocked samples of a reconstructed image into several categories based on relative deblocking edge shape and/or direction. An offset is then determined and added to the samples based on the categories. The offsets are then encoded in the bitstream and employed by the SAO filter 1045 at the decoder. The SAO filter 1045 removes banding artefacts (bands of values instead of smooth transitions) and ringing artefacts (spurious signals near sharp edges).

The ALF 1047, at the encoder, is configured to compare a reconstructed image to an original image. The ALF 1047 determines coefficients that describe the differences between the reconstructed image and the original image, for example via a Wiener based adaptive filter. Such coefficients are encoded in the bitstream and employed by the ALF 1047 at the decoder to remove the differences between the reconstructed image and the original image.

Image data filtered by the in-loop filter 1000 is output to a picture buffer 1023, which is substantially similar to decoded picture buffer 223, 323, and/or 423. As noted above, the deblocking filter 1043, the SAO filter 1045, and/or the ALF 1047 can be turned off at sub-picture boundaries and/or tile boundaries by flags, such as a loop_filter_across_subpic_enabled flag and/or a loop_filter_across_tiles_enabled_flag, respectively.

Figure 11:
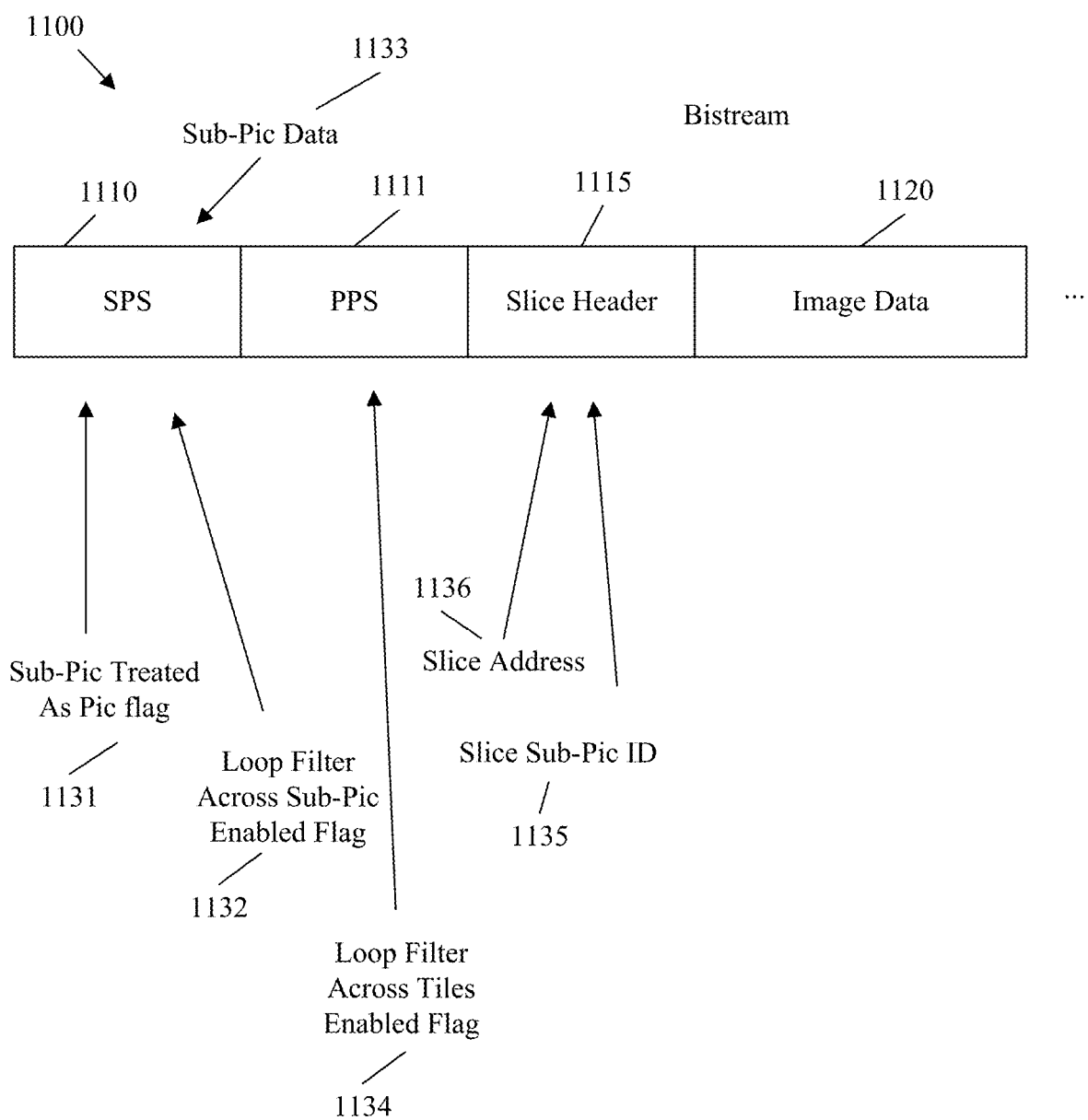
FIG. 11 is a schematic diagram illustrating an example bitstream containing coding tool parameters to support decoding a sub-picture of a picture.

FIG. 11 is a schematic diagram illustrating an example bitstream 1100 containing coding tool parameters to support decoding a sub-picture of a picture. For example, the bitstream 1100 can be generated by a codec system 200 and/or an encoder 300 for decoding by a codec system 200 and/or a decoder 400. As another example, the bitstream 1100 may be generated by an encoder at step 109 of method 100 for use by a decoder at step 111. Further, the bitstream 1100 may contain an encoded picture 500, corresponding sub-pictures 510, and/or associated coded blocks, such as current blocks 801 and/or 901, which may be coded according to unidirectional inter-prediction 600 and/or bidirectional inter-prediction 700 based on a candidate list generated according to pattern 900. The bitstream 1100 may also contain parameters for configuring the in-loop filter 1000.

The bitstream 1100 includes a sequence parameter set (SPS) 1110, a plurality of picture parameter sets (PPSs) 1111, a plurality of slice headers 1115, and image data 1120. An SPS 1110 contains sequence data common to all the pictures in the video sequence contained in the bitstream 1100. Such data can include picture sizing, bit depth, coding tool parameters, bit rate restrictions, etc. The PPS 1111 contains parameters that apply to an entire picture. Hence, each picture in the video sequence may refer to a PPS 1111. It should be noted that, while each picture refers to a PPS 1111, a single PPS 1111 can contain data for multiple pictures in some examples. For example, multiple similar pictures may be coded according to similar parameters. In such a case, a single PPS 1111 may contain data for such similar pictures. The PPS 1111 can indicate coding tools available for slices in corresponding pictures, quantization parameters, offsets, etc. The slice header 1115 contains parameters that are specific to each slice in a picture. Hence, there may be one slice header 1115 per slice in the video sequence. The slice header 1115 may contain slice type information, picture order counts (POCs), reference picture lists, prediction weights, tile entry points, deblocking parameters, etc. It should be noted that a slice header 1115 may also be referred to as a tile group header in some contexts.

The image data 1120 contains video data encoded according to inter-prediction and/or intra-prediction as well as corresponding transformed and quantized residual data. For example, a video sequence includes a plurality of pictures coded as image data. A picture is a single frame of a video sequence and hence is generally displayed as a single unit when displaying the video sequence. However, sub-pictures may be displayed to implement certain technologies such as virtual reality, picture in picture, etc. The pictures each reference a PPS 1111. The pictures are divided into sub-pictures, tiles, and/or slices as discussed above. In some systems, the slices are referred to as tile groups containing tiles. The slices and/or tile groups of tiles reference a slice header 1115. The slices are further divided into CTUs and/or CTBs. The CTUs/CTBs are further divided into coding blocks based on coding trees. The coding blocks can then be encoded/decoded according to prediction mechanisms.

The parameter sets in the bitstream 1100 contain various data that can be employed to implement the examples described herein. To support a first example implementation, the SPS 1110 of the bitstream 1100 contains a sub-pic treated as a pic flag 1131 related to a specified sub-picture. In some examples, the sub-pic treated as a pic flag 1131 is denoted as a subpic_treated_as_pic _flag[i] where i is an index of the sub-picture associated with the flag. For example, the sub-pic treated as a pic flag 1131 may be set equal to one to specify that an i-th sub-picture of each coded picture in a coded video sequence (in the image data 1120) is treated as a picture in a decoding process exclusive of in-loop filtering operations. The sub-pic treated as a pic flag 1131 may be employed when a current sub-picture in a current picture has been coded according to inter-prediction. When the sub-pic treated as a pic flag 1131 is set to indicate the current sub-picture is treated as a picture, a candidate list of candidate motion vectors for a current block can be determined by excluding collocated motion vectors from the candidate list that are included in a collocated block and that point outside of the current sub-picture. This ensures that motion vectors that point outside of the current sub-picture are not selected and associated errors are avoided when the current sub-picture is extracted separately from other subpictures.

In some examples, the candidate list of motion vectors for the current block is determined according to temporal luma motion vector prediction. For example, temporal luma motion vector prediction may be employed when the current block is a luma block of luma samples, a selected current motion vector for the current block is a temporal luma motion vector pointing to reference luma samples in a reference block, and the current block is coded based on the reference luma samples. In such a case, the temporal luma motion vector prediction is performed according to:

--- xColBr = xCb + cbWidth;
yColBr = yCb + cbHeight;
rightBoundaryPos = subpic_treated_as_pic_flag[ SubPicIdx ] ?
    SubPicRightBoundaryPos : pic_width_in_luma_samples − 1; and
botBoundaryPos = subpic_treated_as_pic_flag[ SubPicIdx ] ?
    SubPicBotBoundaryPos : pic_height_in_luma_samples − 1,

--- where xColBr and yColBR specify a location of the collocated block, xCb and yCb specify a top left sample of the current block relative to a top left sample of the current picture, cbWidth is a width of the current block, cbHeight is a height of the current block, SubPicRightBoundaryPos is a position of a right boundary of the sub-picture, SubPicBotBoundaryPos is a position of a bottom boundary of the sub-picture, pic_width_in_luma_samples is a width of the current picture measured in luma samples, pic_height_in_luma_samples is a height of the current picture measured in luma samples, botBoundaryPos is a computed position of the bottom boundary of the sub-picture, rightBoundaryPos is a computed position of the right boundary of the sub-picture, SubPicIdx is an index of the sub-picture, and wherein collocated motion vectors are excluded when yCb>>CtbLog2SizeY is not equal to yColBr>>CtbLog2SizeY, where CtbLog2SizeY indicates a size of a coding tree block.

The sub-pic treated as a pic flag 1131 may also be employed for a second example implementation. As in the first example, the sub-pic treated as a pic flag 1131 may be employed when a current sub-picture in a current picture has been coded according to inter-prediction. In this example, a motion vector can be determined for a current block of the sub-picture (e.g., from a candidate list). When the sub-pic treated as a pic flag 1131 is set, a clipping function can be applied to sample locations in a reference block. A sample location is a position in a picture that can contain a single sample including a luma value and/or a pair of chroma values. An interpolation filter can then be applied when the motion vector points outside of the current sub-picture. This clipping function ensures that the interpolation filter does not rely on data from adjacent sub-pictures in order to maintain separation between the sub-pictures to support separate extraction.

The clipping function can be applied in a luma sample bilincar interpolation process. The luma sample bilincar interpolation process may receive inputs including a luma location in full sample units (xIntL, yIntL). The luma sample bilincar interpolation process outputs a predicted luma sample value (predSampleLXL). The clipping function is applied to the sample locations as follows. When subpic_treated_as_pic_flag[SubPicIdx] is equal to one, the following applies:

xInti=Clip3(SubPicLeftBoundaryPos, SubPicRight-
BoundaryPos, xIntL+$i$), and yInti=Clip3(SubPicTopBoundaryPos, SubPicBot-
BoundaryPos, yIntL+$i$), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$\text{Clip3}(x, y, z) = \begin{cases} x; & z < x \\ y; & z > y \\ z; & \text{otherwise} \end{cases}$$

where x, y, and z are numerical input values.

The clipping function can also be applied in a luma sample eight tap interpolation filtering process. The luma sample eight tap interpolation filtering process receives inputs including a luma location in full sample units (xIntL, yIntL). The luma sample bilinear interpolation process outputs a predicted luma sample value (predSampleLXL). The clipping function is applied to the sample locations as follows. When subpic_treated_as_pic_flag [SubPicIdx] is equal to one, the following applies:

xInti=Clip3(SubPicLeftBoundaryPos, SubPicRight-
BoundaryPos, xIntL+$i$−3), and yInti=Clip3(SubPicTopBoundaryPos, SubPicBot-
BoundaryPos, yIntL+$i$−3), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is as described above.

The clipping function can also be applied in a chroma sample interpolation process. The chroma sample interpolation process receives inputs including a chroma location in full sample units (xIntC, yIntC). The chroma sample interpolation process outputs a predicted chroma sample value (predSampleLXC). The clipping function is applied to the sample locations as follows. When subpic_treated_as_pic_flag[SubPicIdx] is equal to one, the following applies:

xInti=Clip3(SubPicLeftBoundaryPos/SubWidthC,
SubPicRightBoundaryPos/SubWidthC, xIntC+$i$),
and yInti=Clip3(SubPicTopBoundaryPos/SubHeightC,
SubPicBotBoundaryPos/SubHeightC, yIntC+$i$), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, SubWidthC and SubHeightC indicate a horizontal and vertical sampling rate ratio between luma and chroma samples, and Clip3 is as described above.

A loop filter across sub-pic enabled flag 1132 in the SPS 1110 may be employed for a third example implementation. The loop filter across sub-pic enabled flag 1132 may be set to control whether filtering is employed across boundaries of specified sub-pictures. For example, the loop filter across sub-pic enabled flag 1132 may be denoted as a loop_filter_across_subpic_enabled_flag. The loop filter across sub-pic enabled flag 1132 may be set to one when specifying that in-loop filtering operations can be performed across boundaries of the subpicture or set to zero when specifying that in-loop filtering operations are not performed across boundaries of the subpicture. Hence, filtering operations may or may not be performed across the sub-picture boundary based on the value of the loop filter across sub-pic enabled flag 1132. The filtering operations may include applying a deblocking filter 1043, an ALF 1047, and/or a SAO filter 1045. In this way, the filters can be turned off for sub-pictures that are encoded for separate extraction or turned on for sub-pictures that are encoded for display as a group.

A loop filter across tiles enabled flag 1134 in the PPS 1111 may be employed for a fourth example implementation. The loop filter across tiles enabled flag 1134 may be set to control whether filtering is employed across boundaries of specified tiles. For example, the loop filter across tiles enabled flag 1134 may be denoted as a loop_filter_across_tiles_enabled_flag. The loop filter across tiles enabled flag 1134 may be set to one when specifying that in-loop filtering operations can be performed across boundaries of the tile or set to zero when specifying that in-loop filtering operations are not performed across boundaries of the tile. Hence, filtering operations may or may not be performed across specified tile boundaries based on the value of the loop filter across tiles enabled flag 1134. The filtering operations may include applying a deblocking filter 1043, an ALF 1047, and/or a SAO filter 1045.

Sub-picture data 1133 in the SPS 1110 may be employed for a fifth example implementation. The sub-picture data 1133 may include a width, height, and offset for each sub-picture in the image data 1120. For example, the width and height of each sub-picture can be described in the sub-picture data 1133 in units of CTBs. In some examples, the width and height of the sub-picture are stored in the sub-picture data 1133 as subpic_width_minus1 and subpic_height_minus1, respectively. Further, an offset of each sub-picture can be described in the sub-picture data 1133 in units of CTUs. For example, the offset of each sub-picture can be specified as a vertical position and a horizontal position of the top left CTU of the sub-picture. Specifically, the offset of the sub-picture can be specified as a difference between the top left CTU of the picture and the top left CTU of the sub-picture. In some examples, the vertical position and the horizontal position of the top left CTU of the sub-picture is stored in the sub-picture data 1133 as a subpic_ctu_top_left_y and subpic_ctu_top_left_x, respectively. This example implementation describes the sub-pictures in the sub-picture data 1133 in terms of CTBs/CTUs instead of in terms of tiles. This allows sub-pictures to be employed even when tiles are not employed in the corresponding picture/sub-picture.

The sub-picture data 1133 in the SPS 1110, a slice address 1136 in the slice header 1115, and a slice sub-picture ID 1135 in the slice header 1115 may be employed for a sixth example implementation. The sub-picture data 1133 may be implemented as described in the fifth example implementation. The slice address 1136 may include a sub-picture level slice index of a slice (e.g., in image data 1120) associated with the slice header 1115. For example, the slice is indexed based on the slice's position in the sub-picture instead of based on the slice's position in the picture. The slice address 1136 may be stored in a slice_address variable. The slice sub-picture ID 1135 includes an ID of the sub-picture that contains the slice associated with the slice header 1115. Specifically, the slice sub-picture ID 1135 may reference the description (e.g., width, height, and offset) of the corresponding sub-picture in the sub-picture data 1133. The slice sub-picture ID 1135 may be stored in a slice_subpic_id variable. Accordingly, the slice address 1136 is signaled as an index based on the slice's position in the sub-picture denoted by the slice sub-picture ID 1135 as described in the sub-picture data 1133. In this way, the position of the slice in the sub-picture can be determined even when the sub-picture is separately extracted and other sub-pictures are omitted from the bitstream 1100. This is because this addressing scheme segregates each sub-picture's addresses from other sub-pictures. Accordingly, the slice header 1115 does not need to be rewritten when the sub-picture is extracted as would be required in an addressing scheme where the slice is addressed based on the slice's position in the picture. It should be noted that this approach may be employed when the slice is a rectangular/square slice (as opposed to a raster scan slice). For example, a rect_slice_flag in the PPS 1111 can be set equal to one to indicate the slice is a rectangular slice.

An example implementation of sub-pictures used in some video coding systems is as follows. Information related to sub-pictures that may be present in a CVS may be signaled in a SPS. Such signaling may include the following information. The number of sub-pictures that are present in each picture of the CVS may be included in the SPS. In the context of the SPS or a CVS, the collocated sub-pictures for all the access units (AUs) may collectively be referred to as a sub-picture sequence. A loop for further specifying information related to properties of each sub-picture may also be included in the SPS. Such information may include the sub-picture identification, the location of sub-picture (e.g., the offset distance between the top-left corner luma sample of the sub-picture and the top-left corner luma sample of the picture), and the size of the sub-picture. In addition, the SPS may also be employed to signal whether each of the sub-pictures is a motion-constrained sub-picture, where a motion-constrained sub-picture is a sub-picture that contains a MCTS. Profile, tier, and level information for each sub-picture may be included in a bitstream unless such information is otherwise derivable. Such information may be employed for profile, tier, and level information for an extracted bitstream created from extracting the sub-picture from the original bitstream including the entire picture. The profile and tier of each sub-picture may be derived to be the same as the profile and tier of the original. The level for each sub-picture may be signaled explicitly. Such signaling may be present in the loop described above. Sequence-level hypothetical reference decoder (HRD) parameters, may be signaled in a video usability information (VUI) portion of the SPS for each sub-picture (or equivalently, each sub-picture sequence).

When a picture is not partitioned into two or more sub-pictures, the properties of the sub-picture (e.g., location, size, etc.), except the sub-picture ID, may be not signaled in the bitstream. When a sub-picture in pictures in a CVS is extracted, each access unit in the new bitstream may not contain sub-pictures, because the resulting image data in each AU in the new bitstream is not partitioned into multiple sub-pictures. Therefore, the sub-picture properties such as location and size may be omitted from the SPS since such information can be derived from the picture properties. However, the sub-picture identification is still signaled as this ID may be referred to by video coding layer (VCL) NAL units/tile groups included in the extracted sub-picture. Changing the sub-picture ID should be avoided when extracting the sub-picture to reduce resource usage.

The location of a sub-picture in the picture (x offset and y offset) can be signaled in units of luma samples and may represent the distance between the top-left corner luma sample of the sub-picture and top-left corner luma sample of the picture. In another example, the location of a sub-picture in the picture can be signaled in units of the minimum coding luma block size (MinCbSizeY) and may represent the distance between top-left corner luma sample of the sub-picture and top-left corner luma sample of the picture. In another example, the unit of sub-picture location offsets may be explicitly indicated by a syntax element in a parameter set, and the unit may be CtbSizeY, MinCbSizeY, luma sample, or other values. The codec may require that when a sub-picture's right border does not coincide with picture's right border, the sub-picture's width shall be an integer multiple of luma CTU size (CtbSizeY). Likewise, the codec may further require that when a sub-picture's bottom border does not coincide with picture's bottom border, the sub-picture's height shall be an integer multiple of CtbSizeY. The codec may also require that when a sub-picture's width is not an integer multiple of luma CTU size, the sub-picture is located at right most position in the picture. Likewise, the codec may also require the sub-picture to be located at the bottom most position in the picture when the sub-picture's height is not an integer multiple of luma CTU size. When a sub-picture's width is signaled in units of luma CTU size and the width of the sub-picture is not an integer multiple of luma CTU size, the actual width in luma samples may be derived based on the sub-picture's offset location, the sub-picture's width in luma CTU size, and the picture's width in luma samples. Likewise, when a sub-picture's height is signaled in units of luma CTU size and the height of the sub-picture is not an integer multiple of luma CTU size, the actual height in luma samples can be derived based on the sub-picture's offset location, the sub-picture's height in luma CTU size, and the picture's height in luma samples.

For any sub-picture, the sub-picture ID may be different from the sub-picture index. The sub-picture index may be the index of the sub-picture as signaled in the loop of sub-pictures in the SPS. Alternatively, the sub-picture index may be an index assigned in sub-picture raster scan order relative to the picture. When the value of the sub-picture ID of each sub-picture is the same as its sub-picture index, the sub-picture ID may be signaled or derived. When the sub-picture ID of each sub-picture is different from its sub-picture index, the sub-picture ID is explicitly signaled. The number of bits for signaling sub-picture IDs may be signaled in the same parameter set that contains sub-picture properties (e.g., in the SPS). Some values for sub-picture ID may be reserved for certain purposes. Such value reservation can be as follows. When tile group/slice headers contain a sub-picture ID to specify which sub-picture includes the tile group, the value zero may be reserved and may not be used for sub-pictures to ensure the first few bits in the beginning of a tile group/slice header are not all zeros to avoid generating an emulation prevention code. When sub-pictures of a picture do not cover the whole area of the picture without overlap and gap, a value (e.g., value one) may be reserved for tile groups that are not part of any of the sub-pictures. Alternatively, the sub-picture ID of the remaining area may be explicitly signaled. The number of bits for signaling sub-picture ID may be constrained as follows. The value range should be enough to uniquely identify all sub-pictures in a picture, including the reserved values of sub-picture ID. For example, the minimum number of bits for a sub-picture ID can be the value of Ceil(Log2(number of sub-pictures in a picture+number of reserved sub-picture ID).

The union of sub-pictures in a loop may be required to cover the whole picture without gap and without overlap. When this constraint is applied a flag is present for each sub-picture to specify whether the sub-picture is a motion-constrained sub-picture which means the sub-picture can be extracted. Alternatively, the union of sub-pictures may not cover the entire picture. However, there may be no overlap among sub-pictures of a picture.

Sub-picture IDs may be present immediately after a NAL unit header to assist the sub-picture extraction process so the extractor need not understand the rest of the NAL unit bits. For VCL NAL units, the sub-picture ID may be present in the first bits of tile group headers. For non-VCL NAL units, the following may apply. The sub-picture ID may not be required to be present immediately after the NAL unit header for the SPS. Concerning the PPS, when all tile groups of the same picture are constrained to refer to the same PPS, there is no need for sub-picture ID to be present immediately after the NAL unit header. On the other hand, if tile groups of the same picture are allowed to refer to different PPSs, the sub-picture ID may be present in the first bits of PPS (e.g., immediately after the PPS NAL unit header). In this case, no two different tile groups of one picture are allowed to share the same PPS. Alternatively, when tile groups of the same picture are allowed to refer to different PPSs, and different tile groups of the same picture are also allowed to share the same PPS, no sub-picture ID is present in the PPS syntax. Alternatively, when tile groups of the same picture are allowed to refer to different PPSs and different tile groups of the same picture are also allowed to share the same PPS, a list of sub-picture IDs is present in the PPS syntax. The list indicates the sub-pictures to which the PPS applies. For other non-VCL NAL units, if the non-VCL unit applies to the picture level (e.g., access unit delimeter, end of sequence, end of bitstream, etc.) or above, then there is no need for sub-picture ID to be present immediately after its NAL unit header. Otherwise, the sub-picture ID may be present immediately after the NAL unit header.

Tile partitioning within individual sub-pictures may be signaled in the PPS, but tile groups within the same picture are allowed to refer to different PPSs. In this case, tiles are grouped within each sub-picture instead of across the picture. Accordingly, the tile grouping concept in such a case includes a partitioning of a sub-picture into tiles. Alternatively, a Sub-Picture Parameter Set (SPPS) may be employed for describing the tile partitioning within individual sub-pictures. An SPPS refers to an SPS by employing a syntax element referring to the SPS ID. An SPPS may contain sub-picture ID. For sub-picture extraction purposes, the syntax element referring to the sub-picture ID is the first syntax element in SPPS. The SPPS contains a tile structure indicating a number of columns, a number of rows, uniform tile spacing, etc. The SPPS may contain a flag to indicate whether or not loop filter is enabled across associated sub-picture boundaries. Alternatively, the sub-picture properties for each sub-picture may be signaled in the SPPS instead of in the SPS. Tile partitioning within individual sub-pictures may be signaled in the PPS, but tile groups within the same picture are allowed to refer to different PPSs. Once activated, an SPPS may last for a sequence of consecutive AUs in decoding order, but may be deactivated/activated at an AU that is not the start of a CVS. Multiple SPPSs may be active at any moment during the decoding process of a single-layer bitstream with multiple sub-pictures, and an SPPS may be shared by different sub-pictures of an AU. Alternatively, SPPS and PPS can be merged into one parameter set. For this to occur, all tile groups that are included into the same sub-picture may be constrained to refer to the same parameter set resulting from the merge between SPPS and PPS.

The number of bits used for signaling the sub-picture ID may be signaled in the NAL unit header. Such information, when present, assists the sub-picture extraction process in parsing sub-picture ID values for the beginning of a NAL unit's payload (e.g., the first few bits immediately after NAL unit header). For such signaling, some of the reserved bits in a NAL unit header may be used to avoid increasing the length of the NAL unit header. The number of bits for such signaling should cover the value of sub-picture-ID-bit-len. For example, four bits out of seven reserved bits in the VVCs NAL unit header may be used for this purpose.

When decoding a sub-picture, the location of each coding tree block, denoted as vertical CTB position (xCtb) and horizontal CTB position (yCtb), are adjusted to an actual luma sample location in the picture instead of a luma sample location in the sub-picture. In this way, extraction of the co-located sub-picture from each reference picture can be avoided as everything is decoded as if located in the picture instead of in the sub-picture. For adjusting the location of the coding tree block, the variables SubpictureXOffset and Subpicture YOffset are derived based on the sub-picture position (subpic_x_offset and subpic_y_offset). The values of the variables are added to the values of the luma sample location x and y coordinates, respectively, of each coding tree block in the sub-picture. The sub-picture extraction process can be defined as follows. The input to the process includes the target sub-picture to be extracted. This can be input in the form of a sub-picture ID or a sub-picture location. When the input is the sub-picture's location, the associated sub-picture ID can be resolved by parsing the sub-picture information in the SPS. For non-VCL NAL units, the following apply. The syntax elements in the SPS related to picture size and level are updated with the sub-picture's size and level information. The following non-VCL NAL units are not altered by extraction: PPS, access unit delimiter (AUD), end of sequence (EOS), end of bitstream (EOB), and any other non-VCL NAL units that are applicable to picture level or above. The remaining non-VCL NAL units with sub-picture ID not equal to the target sub-picture ID are removed. VCL NAL units with sub-picture ID not equal to the target sub-picture ID are also removed.

A sub-picture nesting SEI message may be used for nesting of AU-level or sub-picture-level SEI messages for a set of sub-pictures. The data carried in the sub-picture nesting SEI message may include buffering period, picture timing, and non-HRD SEI messages. The syntax and semantics of this SEI message can be as follows. For systems operations, such as omnidirectional media format (OMAF) environments, a set of sub-picture sequences covering a viewport may be requested and decoded by the OMAF player. Therefore, a sequence-level SEI message may carry information of a set of sub-picture sequences that collectively include a rectangular or square picture region. The information can be used by systems, and the information is indicative of the minimum decoding capability as well as the bitrate of the set of sub-picture sequences. The information includes the level of the bitstream including only the set of sub-picture sequences, the bit rate of the bitstream, and optionally a sub-bitstream extraction process specified for the set of sub-picture sequences.

The preceding implementation includes several problems. The signaling of the width and height of the picture and/or the widths/heights/offsets of the sub-pictures is not efficient. More bits can be saved for signaling such information. When the sub-picture size and position information is signaled in the SPS, the PPS includes the tile configuration. Further, a PPS is allowed to be shared by multiple sub-pictures of the same picture. Hence, the value ranges for num_tile_columns_minus1 and num_tile_rows_minus1 should be more clearly specified. Further, the semantics of the flag indicating whether a sub-picture is motion constrained is not clearly specified. The level is mandatorily signaled for each sub-picture sequence. However, when a sub-picture sequence cannot be independently decoded, signaling the level of the sub-picture is not useful. Furthermore, in some applications some sub-picture sequences should be decoded and rendered together with at least one other sub-picture sequence. Thus signaling a level for a single one of such sub-picture sequences may be not useful. Further, determining a level value for each sub-picture may burden the encoder.

With the introduction of independently decodable sub-picture sequences, scenarios requiring independent extraction and decoding of certain regions of the pictures may not work based on tile groups. Thus the explicit signaling of tile group IDs may not be useful. Further, the value of each of the PPS syntax elements pps_seq_parameter_set_id and loop_filter_across_tiles_enabled_flag should be the same in all PPSs referred to by the tile group headers of a coded picture. This is because the active SPS should not change within a CVS, and the value of loop_filter_across_tiles_enabled_flag should be the same for all tiles within a picture for parallel processing based on tiles. Whether to allow mixing of rectangular and raster-scan tile groups within a picture should be clearly specified. Whether to allow for sub-pictures that are part of different pictures and employ the same sub-picture ID in a CVS to use different tile group modes should also be specified. The derivation process for temporal luma motion vector prediction may not enable treating sub-picture boundaries as picture boundaries in temporal motion vector prediction (TMVP). Further, the luma sample bilinear interpolation process, the luma sample 8-tap interpolation filtering process, and the chroma sample interpolation process may not be configured to treat sub-picture boundaries as picture boundaries in motion compensation. Also, a mechanism for control of deblocking, SAO, and ALF filtering operations at sub-picture boundaries should also be specified.

With the introduction of independently decodable sub-picture sequences, the loop_filter_across_tile_groups_enabled_flag may be less useful. This is because turning off in-loop filtering operations for parallel processing purposes may also be satisfied by setting loop_filter_across_tile_groups_enabled_flag equal to zero. Further, turning off in-loop filtering operations for enabling independent extraction and decoding of certain regions of the pictures may also be satisfied by setting loop_filter_across_sub_pic_enabled_flag equal to zero. Therefore, additionally specifying the processes for turning off in-loop filtering operations across tile group boundaries based on loop_filter_across_tile_groups_enabled_flag would unnecessarily burden the decoder and waste bits. In addition, the decoding process as specified above may not enable turning off the ALF filtering operations across tile boundaries.

As such, the present disclosure includes designs for supporting sub-picture based video coding. A sub-picture is a rectangular or square area within a picture that may or may not be decoded independently using the same decoding process as a picture. The descriptions of the techniques are based on the Versatile Video Coding (VVC) standard. However, the techniques may also apply to other video codec specifications.

In some examples, a size unit is signaled for the picture width and height syntax elements and the list of sub-picture width/height/offset_x/offset_y syntax elements. All syntax elements are signaled in the form of xxx_minus1. For example, when the size unit is sixty four luma samples, a width value of ninety nine specifies a picture width of six thousand four hundred luma samples. The same example applies for other of these syntax elements. In another example, one or more of the following applies. A size unit may be signaled for the picture width and height syntax elements in the form of xxx_minus1. Such a size unit signaled for the list of sub-picture width/height/offset_x/offset_y syntax elements may be in the form of xxx_minus1. In another example, one or more of the following applies. A size unit for the picture width and the list of sub-picture width/offset_x syntax elements may be signaled in the form of xxx_minus1. A size unit for the picture height and the list of sub-picture height/offset_y syntax elements may be signaled in the form of xxx_minus1. In another example, one or more of the following applies. The picture width and height syntax elements in the form of xxx_minus1 may be signaled in units of minimum coding units. The sub-picture width/height/offset_x/offset_y syntax elements in the form of xxx_minus1 may be signaled in units of CTUs or CTBs. The sub-picture width for each sub-picture at the right picture boundary may be derived. The sub-picture height for each sub-picture at the bottom picture boundary may be derived. Other values of the sub-picture width/height/offset_x/offset_y may all be signaled in the bitstream. In other examples, a mode for signaling of the widths and heights of the sub-pictures as well as their positions within the picture may be added for cases when the sub-pictures have a uniform size. The sub-pictures have uniform size when they include the same sub-picture rows and sub-picture columns. In this mode, the number of sub-picture rows, the number of sub-picture columns, the width of each sub-picture column, and the height of each sub-picture row may all be signaled.

In another example, signaling of the sub-picture width and height may not be included in the PPS. The num_tile_columns_minus1 and num_tile_rows_minusI should be in the range of zero to one an integer value such as a thousand twenty four, inclusive. In another example, when sub-pictures referring to the PPS have more than one tile, two syntax elements conditioned by a presence flag may be signaled in the PPS. These syntax elements are employed for signaling the sub-picture width and height in units of CTBs and specify the size of all sub-pictures referring to the PPS.

In another example, additional information describing individual sub-pictures may also be signaled. A flag, such as a sub_pic_treated_as_pic_flag[i], may be signaled for each sub-picture sequence to indicate whether the sub-pictures of the sub-picture sequence are treated as pictures in the decoding process for purposes other than in-loop filtering operations. The level to which a sub-picture sequence conforms may only be signaled when the sub_pic_treated_as_pic_flag[i] is equal to one. A sub-picture sequence is a CVS of sub-pictures with the same sub-picture ID. When the sub_pic_treated_as_pic_flag[i] is equal to one, the level of the sub-picture sequence may also be signaled. This can be controlled by a flag for the all the sub-picture sequences or by one flag per each sub-picture sequence. In another example, sub-bitstream extraction may be enabled without changing VCL NAL units. This can be accomplished by removing explicit tile group ID signaling from the PPS. The semantics of tile_group_address are specified when rect_tile_group_flag is equal to one indicating rectangluar tile groups. The tile_group_address may include the tile group index of the tile group among tile groups within the sub-picture.

In another example, the value of each of the PPS syntax elements pps_seq_parameter_set_id and loop_filter_across_tiles_enabled_flag shall be the same in all PPSs referred to by the tile group headers of a coded picture. Other PPS syntax elements may be different for different PPSs referred to the tile group headers of a coded picture. The value of single_tile_in_pic_flag may be different for different PPSs referred to the tile group headers of a coded picture. This way, some pictures in a CVS may have only one tile, while some other pictures in a CVS may have multiple tiles. This also allows some sub-pictures of a picture (e.g., those that are very big) to have multiple tiles while other sub-pictures of the same picture (e.g., those that are very small) have only one tile.

In another example, a picture may include a mix of rectangular and raster-scan tile groups. Accordingly, some sub-pictures of the picture use the rectangular tile group mode, while other sub-pictures use the raster-scan tile group mode. This flexibility is beneficial for bitstream merging scenarios. Alternatively, a constraint may require that all sub-pictures of a picture shall use the same tile group mode. The sub-pictures from different pictures with the same sub-picture ID in a CVS may not use different tile group modes. The sub-pictures from different pictures with the same sub-picture ID in a CVS may use different tile group modes.

In another example, when the sub_pic_treated_as_pic_flag[i] for a sub-picture is equal to one, collocated motion vectors for temporal motion vector prediction for the sub-picture are limited to come from within the boundaries of the sub-picture. Accordingly, temporal motion vector prediction for the sub-picture is treated as if the sub-picture boundaries were picture boundaries. Further, clipping operations are specified as a part of the luma sample bilinear interpolation process, the luma sample 8-tap interpolation filtering process, and the chroma sample interpolation process, to enable treating sub-picture boundaries as picture boundaries in motion compensation for sub-pictures for which the sub_pic_treated_as_pic_flag[i] is equal to one.

In another example, each sub-picture is associated with a signaled flag, such as a loop_filter_across_sub_pic_enabled_ flag. The flag is employed for control of in-loop filtering operations at the boundaries of the sub-picture and for control of the filtering operations in the corresponding decoding processes. The deblocking filter process may not be applied to coding sub-block edges and transform block edges that coincide with the boundaries of sub-pictures for which loop_filter_across_sub_pic_enabled_flag is equal to zero. Alternatively, the deblocking filter process is not applied to coding sub-block edges and transform block edges that coincide with the upper or left boundaries of sub-pictures for which loop_filter_across_sub_pic_enabled_flag is equal to zero. Alternatively, the deblocking filter process is not applied to coding sub-block edges and transform block edges that coincide with the boundaries of sub-pictures for which sub_pic_treated_as_pic_flag[i] is equal to one or zero. Alternatively, the deblocking filter process is not applied to coding sub-block edges and transform block edges that coincide with the upper or left boundaries of sub-pictures. A clipping operation may be specified to turn off the SAO filtering operation across the boundaries of a sub-picture when loop_filter_across_sub_pic_enabled_flag for the sub-picture is equal to zero. A clipping operation may be specified to turn off the ALF filtering operation across the boundaries of the sub-picture when loop_filter_across_sub_pic_enabled_flag is equal to zero for a sub-picture. The loop_filter_across_tile_groups_enabled_flag may also be removed from the PPS. Accordingly, when the loop_filter_across_tiles_enabled_flag is equal to zero, in-loop filtering operations across tile group boundaries that are not sub-picture boundaries are not turned off. The loop filter operations may include deblocking, SAO, and ALF. In another example, a clipping operation is specified to turn off the ALF filtering operation across the boundaries of a tile when loop_filter_across_tiles_enabled_flag for the tile is equal to zero.

One or more of the preceding examples may be implemented as follows. A sub-picture may be defined as a rectangular or square region of one or more tile groups or slices within a picture. The following divisions of processing elements may form spatial or component-wise partitioning: the division of each picture into components, the division of each component into CTBs, the division of each picture into sub-pictures, the division of each sub-picture into tile columns within a sub-picture, the division of each sub-picture into tile rows within a sub-picture, the division of each tile column within a sub-picture into tiles, the division of each tile row within a sub-picture into tiles, and the division of each sub-picture into tile groups.

The process for CTB raster and tile scanning process within a sub-picture may be as follows. The list ColWidth[i] for i ranging from zero to num_tile_columns_minus1, inclusive, specifying the width of the i-th tile column in units of CTBs, may be derived as follows:

```
if( uniform_tile_spacing_flag )                                    (6-1)
  for( i = 0; i <= num_tile_columns_minus1; i++ )
    ColWidth[ i ] = ( ( i + 1 ) * SubPicWidthInCtbsY ) /
( num_tile_columns_minus1 + 1 ) -
      ( i * SubPicWidthInCtbsY ) / ( num_tile_columns_minus1 + 1 )
else {
  ColWidth[ num_tile_columns_minus1 ] = SubPicWidthInCtbsY
  for( i = 0; i < num_tile_columns_minus1; i++ ) {
    ColWidth[ i ] = tile_column_width_minus1[ i ] + 1
    ColWidth[ num_tile_columns_minus1 ] -= ColWidth[ i ]
  }
}
```

The list RowHeight[j] for j ranging from zero to num_tile_rows_minus1, inclusive, specifying the height of the j-th tile row in units of CTBs, is derived as follows:

```
if( uniform_tile_spacing_flag )                                    (6-2)
  for( j = 0; j <= num_tile_rows_minus1; j++ )
    RowHeight[ j ] = ( ( j + 1 ) * SubPicHeightInCtbsY ) / (
num_tile_rows_minus1 + 1 ) -
      ( j * SubPicHeightInCtbsY ) / ( num_tile_rows_minus1 + 1 )
else {
  RowHeight[ num_tile_rows_minus1 ] = SubPicHeightInCtbsY
  for( j = 0; j < num_tile_rows_minus1; j++ ) {
    RowHeight[ j ] = tile_row_height_minus1[ j ] + 1
    RowHeight[ num_tile_rows_minus1 ] -= RowHeight[ j ]
  }
}
```

The list ColBd[i] for i ranging from zero to num_tile_columns_minus1+1, inclusive, specifying the location of the i-th tile column boundary in units of CTBs, is derived as follows:

```
for( ColBd[ 0 ] = 0, i = 0; i <= num_tile_columns_minus1; i++ ) (6-3)
  ColBd[ i + 1 ] = ColBd[ i ] + ColWidth[ i ]
```

The list RowBd[j] for j ranging from zero to num_tile_rows_minus1+1, inclusive, specifying the location of the j-th tile row boundary in units of CTBs, is derived as follows:

```
for( RowBd[ 0 ]=0, j = 0; j <= num_tile_rows_minus1; j++) (6-4)
  RowBd[ j + 1 ] = RowBd[ j ] + RowHeight[ j ]
```

The list CtbAddrRsToTs[ctbAddrRs] for ctbAddrRs ranging from zero to SubPicSizeInCtbsY−1, inclusive, specifying the conversion from a CTB address in CTB raster scan of a sub-picture to a CTB address in tile scan of the sub-picture, is derived as follows:

```
                                                                    (6-5)
for( ctbAddrRs = 0; ctbAddrRs < SubPicSizeInCtbsY; ctbAddrRs++ ) {
  tbX = ctbAddrRs % SubPicWidthInCtbsY
  tbY = ctbAddrRs / SubPicWidthInCtbsY
  for( i = 0; i <= num_tile_columns_minus1; i++ )
    if( tbX >= ColBd[ i ] )
      tileX = i
  for( j = 0; j <= num_tile_rows_minus1; j++ )
    if( tbY >= RowBd[ j ] )
      tileY = j
  CtbAddrRsToTs[ ctbAddrRs ] = 0
  for( i = 0; i < tileX; i++ )
    CtbAddrRsToTs[ ctbAddrRs ] += RowHeight[ tileY ] * ColWidth[ i]
  for( j = 0; j < tileY; j++ )
    CtbAddrRsToTs[ ctbAddrRs ] += SubPicWidthInCtbsY *
RowHeight[ j ] CtbAddrRsToTs[ ctbAddrRs ] += ( tbY − RowBd[ tileY ]
) * ColWidth[ tileX ] + tbX − ColBd[ tileX ]
}
```

The list CtbAddrTsToRs[ctbAddrTs] for ctbAddrTs ranging from zero to SubPicSizeInCtbsY−1, inclusive, specifying the conversion from a CTB address in tile scan to a CTB address in CTB raster scan of a sub-picture, is derived as follows:

```
for( ctbAddrRs = 0; ctbAddrRs < SubPicSizeInCtbsY;          (6-6)
ctbAddrRs++ )
  CtbAddrTsToRs[ CtbAddrRsToTs[ ctbAddrRs ] ] = ctbAddrRs
```

The list TileId[ctbAddrTs] for ctbAddrTs ranging from 0 to SubPicSizeInCtbsY−1, inclusive, specifying the conversion from a CTB address in tile scan of a sub-picture to a tile ID, is derived as follows:

```
for( j = 0, tileIdx = 0; j <= num_tile_rows_minus1; j++)    (6-7)
  for( i = 0; i <= num_tile_columns_minus1; i++, tileIdx++ )
    for( y = RowBd[ j ]; y < RowBd[ j + 1 ]; y++ )
      for( x = ColBd[ i ]; x < ColBd[ i + 1 ]; x++)
        TileId[ CtbAddrRsToTs[ y * SubPic WidthInCtbsY +
x ] ] = tileIdx
```

The list NumCtusInTile[tileIdx] for tileIdx ranging from 0 to NumTilesInSubPic−1, inclusive, specifying the conversion from a tile index to the number of CTUs in the tile, is derived as follows:

```
for( j = 0, tileIdx = 0; j <= num_tile_rows_minus1; j++)    (6-8)
  for( i = 0; i <= num_tile_columns_minus1; i++, tileIdx++ )
    NumCtusInTile[ tileIdx ] = ColWidth[ i ] * RowHeight[ j ]
```

The list FirstCtbAddrTs[tileIdx] for tileIdx ranging from zero to NumTilesInSubPic−1, inclusive, specifying the conversion from a tile ID to the CTB address in tile scan of the first CTB in the tile are derived as follows:

```
                                                                    (6-9)
for( ctbAddrTs = 0, tileIdx = 0, tileStartFlag = 1; ctbAddrTs <
SubPicSizeInCtbsY; ctbAddrTs++ ) {
  if( tileStartFlag) {
    FirstCtbAddrTs[ tileIdx ] = ctbAddrTs
    tileStartFlag = 0
  }
  tileEndFlag = ctbAddrTs = = SubPicSizeInCtbsY − 1 ||
  TileId[ ctbAddrTs + 1 ] != TileId[ ctbAddrTs ]
  if( tileEndFlag ) {
    tileIdx++
    tileStartFlag = 1
  }
}
```

The values of Column WidthInLumaSamples[i], specifying the width of the i-th tile column in units of luma samples, are set equal to ColWidth[i]<<CtbLog2SizeY for i ranging from 0 to num_tile_columns_minus1, inclusive. The values of RowHeightInLumaSamples[j], specifying the height of the j-th tile row in units of luma samples, are set equal to RowHeight[j]<<CtbLog2SizeY for j ranging from 0 to num_ tile_rows_minus1, inclusive.

An example sequence parameter set RBSP syntax is as follows.

| | Descriptor |
|---|---|
| seq_parameter_set_rbsp( ) { | |
|   sps_max_sub_layers_minus1 | u(3) |
|   sps_reserved_zero_5bits | u(5) |
|   profile_tier_level( sps_max_sub_layers_minus1 ) | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   num_sub_pics_minus1 | ue(v) |
|   sub_pic_id_len_minus1 | ue(v) |
|   if( num_sub_pics_minus1 > 0 ) | |
|     sub_pic_level_present_flag | u(1) |
|   for ( i = 0; i <= num_sub_pics_minus1; i++ ) { | |
|     sub_pic_id[ i ] | u(v) |
|     if( num_subpics_minus1 > 0 ) { | |
|       sub_pic_treated_as_pic_flag[ i ] | u(1) |
|       if( sub_pic_treated_as_pic_flag[ i ] && | |
|       sub_pic_level_present_flag ) | |
|         sub_pic_level_idc[ i ] | u(8) |
|       sub_pic_x_offset[ i ] | ue(v) |
|       sub_pic_y_offset[ i ] | ue(v) |
|       sub_pic_width_in_luma_samples[ i ] | ue(v) |
|       sub_pic_height_in_luma_samples[ i ] | ue(v) |
|     } | |
|   } | |
|   log2_max_pic_order_cnt_lsb_minus4 | ue(v) |
| ... | |

An example picture parameter set RBSP syntax is as follows.

| | Descriptor |
|---|---|
| pic_parameter_set_rbsp( ) { | |
|   pps_pic_parameter_set_id | ue(v) |
|   pps_seq_parameter_set_id | ue(v) |
|   loop_filter_across_sub_pic_enabled_flag | u(1) |
|   single_tile_in_sub_pic_flag | u(1) |
|   if( !single_tile_in_sub_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if( !single_tile_per_tile_group_flag ) | |
|       rect_tile_group_flag | u(1) |
|   if( rect_tile_group_flag && | |
|   !single_tile_per_tile_group_flag ) { | |
|     num_tile_groups_in_sub_pic_minus1 | ue(v) |
|     for( i = 0; i <= num_tile_groups_in_sub_pic_minus1; i++ ) { | |
|       if( i > 0) | |
|         top_left_tile_idx[ i ] | u(v) |
|       bottom_right_tile_idx[ i ] | u(v) |
|     } | |
|   } | |
|   loop_filter_across_tiles_enabled_flag | u(1) |
| } | |
| for( i = 0; i < 2; i++ ) | |
|   num_ref_idx_default_active_minus1[ i ] | ue(v) |

An example general tile group header syntax is as follows.

| | Descriptor |
|---|---|
| tile_group_header( ) { | |
|   tile_group_pic_parameter_set_id | ue(v) |
|   tile_group_sub_pic_id | u(v) |
|   if( NumTilesInSubPic > 1 \|\| !( rect_tile_group_flag && | |
|   num_tile_group_in_sub_pic_minus1 = = 0 ) ) | |
|     tile_group_address | u(v) |

An example coding tree unit syntax is as follows.

| | Descriptor |
|---|---|
| coding_tree_unit( ) { | |
|   xCtb = ( ( CtbAddrInRs % SubPicWidthInCtbsY ) << CtbLog2SizeY ) + | |
|     sub_pic_x_offset[ SubPicIdx[ tile_group_subpic_id ] ] | |
|   yCtb = ( ( CtbAddrInRs / SubPicWidthInCtbsY ) << CtbLog2SizeY ) + | |
|     sub_pic_y_offset[ SubPicIdx[ tile_group_subpic_id ] ] | |
|   ... | |

An example sequence parameter set RBSP semantics is as follows.

The bit_depth_chroma_minus8 specifies the bit depth of the samples of the chroma arrays BitDepthC and the value of the chroma quantization parameter range offset QpBdOffsetC is as follows:

$$BitDepthC = 8 + bit\_depth\_chroma\_minus8 \quad (7\text{-}4)$$

$$QpBdOffsetC = 6 * bit\_depth\_chroma\_minus8 \quad (7\text{-}5)$$

The bit_depth_chroma_minus8 shall be in the range of zero to eight, inclusive.

The num_sub_pics_minus1 plus one specifies the number of sub-pictures in each coded picture in the CVS. The value of num_sub_pics_minus1 shall be in the range of zero to one thousand twenty four, inclusive. The sub_pic_id_len_minus1 plus one specifies the number of bits used to represent the syntax element sub_pic_id[i] in the SPS and the syntax element tile_group_sub_pic_id in the tile group headers. The value of sub_pic_id_len_minus1 shall be in the range of Ceil(Log2(num_sub_pic_minus1+1))–1 to nine, inclusive. The sub_pic_level_present_flag is set to one to specify that the syntax element sub_pic_level_idc[i] may be present. The sub_pic_level_present_flag is set to zero to specify that the syntax element sub_pic_level_idc[i] is not present. The sub_pic_id[i] specifies the sub-picture ID of the i-th sub-picture of each coded picture in the CVS. The length of sub_pic_id[i] is sub_pic_id_len_minus1+1 bits.

The sub_pic_treated_as_pic_flag[i] is set equal to one to specify that the i-th sub-picture of each coded picture in the CVS is treated as a picture in the decoding process excluding in-loop filtering operations. The sub_pic_treated_as_pic_flag[i] is set equal to zero to specify that the i-th sub-picture of each coded picture in the CVS is not treated as a picture in the decoding process excluding in-loop filtering operations. The sub_pic_level_idc[i] indicates the level to which the i-th sub-picture sequence conforms, where the i-th sub-picture sequence consisting of only the VCL NAL units of the sub-pictures with sub-picture ID equal to sub_pic_id[i] in the CVS and their associated non-VCL NAL units. The sub_pic_x_offset[i] specifies the horizontal offset, in units of luma samples, of the top-left corner luma sample of the i-th sub-picture relative to the top-left corner luma sample of each picture in the CVS. When not present, the value of sub_pic_x_offset[i] is inferred to be equal to zero. The sub_pic_y_offset[i] specifies the vertical offset, in units of luma samples, of the top-left corner luma sample of the i-th sub-picture relative to the top-left corner luma sample of each picture in the CVS. When not present, the value of sub_pic_y_offset[i] is inferred to be equal to zero. The sub_pic_width_in_luma_samples[i] specifies the width, in units of luma samples, of the i-th sub-picture of each picture in the CVS. When the sum of sub_pic_x_offset[i] and sub_pic_width_in_luma_samples[i] is less than pic_width_in_luma_samples, the value of sub_pic_width_in_luma_samples[i] shall be an integer multiple of CtbSize Y. When not present, the value of sub_pic_width_in_luma_samples[i] is inferred to be equal to pic_width_in_luma_samples. The sub_pic_height_in_luma_samples[i] specifies the height, in units of luma samples, of the i-th sub-picture for each picture in the CVS. When the sum of sub_pic_y_offset[i] and sub_pic_height_in_luma_samples[i] is less than pic_height_in_luma_samples, the value of sub_pic_height_in_luma_samples[i] shall be an integer multiple of CtbSize Y. When not present, the value of sub_pic_height_in_luma_samples[i] is inferred to be equal to pic_height_in_luma_samples.

For bitstream conformance, the following constraints apply. For any integer values of i and j, when i is equal to j, the values of sub_pic_id[i] and sub_pic_id[j] shall not be the same. For any two sub-pictures subpicA and subpicB, when the sub-picture ID of subpicA is less than the sub-picture ID of subpicB, any coded tile group NAL unit of subPicA shall succeed any coded tile group NAL unit of subPicB in decoding order. The shapes of the sub-pictures shall be such that each sub-picture, when decoded, shall have its entire left boundary and entire top boundary consisting of a picture boundary or consisting of boundaries of previously decoded sub-picture(s).

The list SubPicIdx[spId] for spId values equal to sub_pic_id[i] with i ranging from 0 to num_sub_pics_minus1, inclusive, specifying the conversion from a sub-picture ID to the sub-picture index, is derived as follows:

```
for( i = 0; i <= num_sub_pics_minus1; i++ )    (7-5)
    SubPicIdx[ sub_pic_id[ i ] ] = i
```

The log2_max_pic_order_cnt_lsb_minus4 specifies the value of the variable MaxPicOrderCntLsb that is used in the decoding process for picture order count as follows:

$$MaxPicOrderCntLsb = 2(\log2\_max\_pic\_order\_cnt\_lsb\_minus4 + 4)(7\text{-}5)$$

The value of log2_max_pic_order_cnt_lsb_minus4 shall be in the range of zero to twelve, inclusive.

An example picture parameter set RBSP semantics is as follows.

When present, the value of each of the PPS syntax elements pps_seq_parameter_set_id and loop_filter_across_tiles_enabled_flag shall be the same in all PPSs referred to by the tile group headers of a coded picture. The pps_pic_parameter_set_id identifies the PPS for reference by other syntax elements. The value of pps_pic_parameter_set_id shall be in the range of zero to sixty three, inclusive. The pps_seq_parameter_set_id specifies the value of sps_seq_parameter_set_id for the active SPS. The value of pps_seq_parameter_set_id shall be in the range of zero to fifteen, inclusive. The loop_filter_across_sub_pic_enabled_flag is set equal to one to specify that in-loop filtering operations may be performed across the boundaries of the sub-picture referring to the PPS. The loop_filter_across_sub_pic_enabled_flag is set equal to zero to specify that in-loop filtering operations are not performed across the boundaries of the sub-picture referring to the PPS.

The single_tile_in_sub_pic_flag is set equal to one to specify that there is only one tile in each sub-picture referring to the PPS. The single_tile_in_sub_pic_flag is set equal to zero to specify that there is more than one tile in each sub-picture referring to the PPS. The num_tile_columns_minus1 plus 1 specifies the number of tile columns partitioning the sub-picture. The num_tile_columns_minus1 shall be in the range of zero to one thousand twenty four, inclusive. When not present, the value of num_tile_columns_minus1 is inferred to be equal to zero. The num_tile_rows_minus1 plus 1 specifies the number of tile rows partitioning the sub-picture. The num_tile_rows_minus1 shall be in the range of zero to one thousand twenty four. When not present, the value of num_tile_rows_minus1 is inferred to be equal to zero. The variable Num TilesInSubPic is set equal to (num_tile_columns_minus1+1)*(num_tile_rows_minus1+1). When single_tile_in_sub_pic_flag is equal to zero, NumTilesInSubPic shall be greater than one.

The uniform_tile_spacing_flag is set equal to one to specify that tile column boundaries and likewise tile row boundaries are distributed uniformly across the sub-picture. The uniform_tile_spacing_flag is set equal to zero to specify that tile column boundaries and likewise tile row boundaries are not distributed uniformly across the sub-picture but signaled explicitly using the syntax elements tile_column_width_minus1[i] and tile_row_height_minus1[i]. When not present, the value of uniform_tile_spacing_flag is inferred to be equal to one. The tile_column_width_minus1 [i] plus 1 specifies the width of the i-th tile column in units of CTBs. The tile_row_height_minus1[i] plus 1 specifies the height of the i-th tile row in units of CTBs. The single_tile_per_tile_group is set equal to one to specify that each tile group that refers to this PPS includes one tile. The single_tile_per_tile_group is set equal to zero to specify that a tile group that refers to this PPS may include more than one tile.

The rect_tile_group_flag is set equal to zero to specify that tiles within each tile group of the sub-picture are in raster scan order and the tile group information is not signaled in PPS. The rect_tile_group_flag is set equal to one to specify that tiles within each tile group cover a rectangular or square region of the sub-picture and the tile group information is signaled in the PPS. When single_tile_per_tile_group_flag is set to one rect_tile_group_flag is inferred to be equal to one. The num_tile_groups_in_sub_pic_minus1 plus 1 specifies the number of tile groups in each sub-picture referring to the PPS. The value of num_tile_groups_in_sub_pic_minus1 shall be in the range of zero to NumTilesInSubPic−1, inclusive. When not present and single_tile_per_tile_group_flag is equal to one, the value of num_tile_groups_in_sub_pic_minus1 is inferred to be equal to NumTilesInSubPic−1.

The top_left_tile_idx[i] specifies the tile index of the tile located at the top-left corner of the i-th tile group of the sub-picture. The value of top_left_tile_idx[i] shall not be equal to the value of top_left_tile_idx[j] for any i not equal to j. When not present, the value of top_left_tile_idx[i] is inferred to be equal to i. The length of the top_left_tile_idx [i] syntax element is Ceil(Log2 (NumTilesInSubPic) bits. The bottom_right_tile_idx[i] specifies the tile index of the tile located at the bottom-right corner of the i-th tile group of the sub-picture. When single_tile_per_tile_group_flag is set to one, the bottom_right_tile_idx[i] is inferred to be equal to top_left_tile_idx[i]. The length of the bottom_right_tile_idx[i] syntax element is Ceil(Log2(NumTilesInSubPic)) bits.

It is a requirement of bitstream conformance that any particular tile shall only be included in one tile group. The variable NumTilesInTileGroup[i], which specifies the number of tiles in the i-th tile group of the sub-picture, and related variables, are derived as follows:

(7-33)
deltaTileIdx = bottom_right_tile_idx[ i ] − top_left_tile_idx[ i ]
NumTileRowsInTileGroupMinus1 [ i ] = deltaTileIdx /
( num_tile_columns_minus1 + 1)
NumTileColumnsInTileGroupMinus1 [ i ] = deltaTileIdx %

-continued ( num_tile_columns_minus1 + 1)
NumTilesInTileGroup[ i ] = ( NumTileRowsInTileGroupMinus1
[ i ] + 1) * ( NumTileColumnsInTileGroupMinus1[ i ] + 1 )

The loop_filter_across_tiles_enabled_flag is set equal to one to specify that in-loop filtering operations may be performed across tile boundaries in sub-pictures referring to the PPS. The loop_filter_across_tiles_enabled_flag is set equal to zero to specify that in-loop filtering operations are not performed across tile boundaries in sub-pictures referring to the PPS. The in-loop filtering operations include the deblocking filter, sample adaptive offset filter, and adaptive loop filter operations. When not present, the value of loop_filter_across_tiles_enabled_flag is inferred to be equal to one. The num_ref_idx_default_active_minus1[i] plus 1, when i is equal to zero, specifies the inferred value of the variable NumRefIdxActive[0] for P or B tile groups with num_ref_idx_active_override_flag equal to 0, and, when i is equal to one, specifies the inferred value of NumRefIdxActive[1] for B tile groups with num_ref_idx_active_override_flag equal to zero. The value of num_ref_idx_default_active_minus1[i] shall be in the range of zero to fourteen, inclusive.

An example general tile group header semantics is as follows. When present, the value of each of the tile group header syntax elements tile_group_pic_order_cnt_lsb and tile_group_temporal_mvp_enabled_flag shall be the same in all tile group headers of a coded picture. When present, the value of the tile_group_pic_parameter_set_id shall be the same in all tile group headers of a coded sub-picture. The tile_group_pic_parameter_set_id specifies the value of pps_pic_parameter_set_id for the PPS in use. The value of tile_group_pic_parameter_set_id shall be in the range of zero to sixty three, inclusive. It is a requirement of bitstream conformance that the value of TemporalId of the current picture shall be greater than or equal to the value of TemporalId of each PPS referred to by a tile group of the current picture. The tile_group_sub_pic_id identifies the sub-picture to which the tile group belongs. The length of tile_group_sub_pic_id is sub_pic_id_len_minus1+1 bits. The value of tile_group_sub_pic_id shall be the same for all tile group headers of a coded sub-picture.

The variables SubPic WidthInCtbs Y, SubPicHeightInCtbsY, and SubPicSizeInCtbs Y are derived as follows:

(7-34)
i = SubPicIdx[ tile_group_subpic_id ]
SubPic WidthInCtbsY =
Ceil( sub_pic_width_in_luma_samples[ i ] ÷ CtbSizeY )
SubPicHeightInCtbsY =
Ceil( sub_pic_height_in_luma_samples[ i ] ÷ CtbSizeY )
SubPicSizeInCtbsY = SubPic WidthInCtbsY * SubPicHeightInCtbs Y The following variables are derived by invoking the CTB raster and tile scanning conversion process: the list ColWidth[i] for i ranging from zero to num_tile_columns_minus1, inclusive, specifying the width of the i-th tile column in units of CTBs; the list RowHeight[j] for j ranging from zero to num_tile_rows_minus1, inclusive, specifying the height of the j-th tile row in units of CTBs; the list ColBd[i] for i ranging from zero to num_tile_columns_minus1+1, inclusive, specifying the location of the i-th tile column boundary in units of CTBs; the list RowBd[j] for j ranging from zero to num_tile_rows_minus1+1, inclusive, specifying the location of the j-th tile row boundary in units of CTBs; the list CtbAddrRsToTs[ctbAddrRs] for ctbAddrRs ranging from zero to SubPicSizeInCtbsY−1, inclusive, specifying the conversion from a CTB address in the CTB raster scan of a sub-picture to a CTB address in the tile scan of the sub-picture; the list CtbAddrTsToRs[ctbAddrTs] for ctbAddrTs ranging from zero to SubPicSizeInCtbsY−1, inclusive, specifying the conversion from a CTB address in the tile scan of a sub-picture to a CTB address in the CTB raster scan of the sub-picture; the list TileId[ctbAddrTs] for ctbAddrTs ranging from zero to SubPicSizeInCtbsY−1, inclusive, specifying the conversion from a CTB address in tile scan of a sub-picture to a tile ID; the list NumCtusInTile[tileIdx] for tileIdx ranging from zero to NumTilesInSubPic−1, inclusive, specifying the conversion from a tile index to the number of CTUs in the tile; the list FirstCtbAddrTs[tileIdx] for tileIdx ranging from zero to NumTilesInSubPic−1, inclusive, specifying the conversion from a tile ID to the CTB address in tile scan of the first CTB in the tile; the list ColumnWidthInLumaSamples[i] for i ranging from zero to num_tile_columns_minus1, inclusive, specifying the width of the i-th tile column in units of luma samples; and the list RowHeightInLumaSamples[j] for j ranging from zero to num_tile_rows_minus1, inclusive, specifying the height of the j-th tile row in units of luma samples.

The values of ColumnWidthInLumaSamples[i] for i ranging from zero to num_tile_columns_minus1, inclusive, and RowHeightInLumaSamples[j] for j ranging from zero to num_tile_rows_minus1, inclusive, shall all be greater than zero. The variables SubPicLeftBoundaryPos, SubPic TopBoundary Pos, SubPicRightBoundaryPos and SubPicBotBoundaryPos are derived as follows:

```
                                                          (7-34)
i = SubPicIdx[ tile_group_subpic_id ]
if( sub_pic_treated_as_pic_flag[ i ] ) {
SubPicLeftBoundaryPos = sub_pic_x_offset[ i ]
SubPicRightBoundaryPos =
SubPicLeftBoundaryPos + sub_pic_width_in_luma_samples[ i ] − 1
SubPicTopBoundaryPos = sub_pic_y_offset[ i ]
SubPicBotBoundaryPos =
SubPicTopBoundaryPos + sub_pic_height_in_luma_samples[ i ] − 1
}
```

For each tile, with index i=0. NumTilesInSubPic−1 in the current sub-picture, the variables TileLeftBoundaryPos[i], TileTopBoundaryPos[i], TileRightBoundaryPos[i], and TileBotBoundaryPos[i] are derived as follows:

```
                                                          (7-41)
tileColIdx = i % ( num_tile_columns_minus1 + 1)
tileRowIdx = i / ( num_tile_columns_minus1 + 1)
TileLeftBoundaryPos[ i ] = SubPicLeftBoundaryPos +
( ColBd[ tileColIdx ] << CtbLog2SizeY ) )
TileRightBoundaryPos[ i ] = SubPicLeftBoundaryPos +
( ( ColBd[ tileColIdx ] + ColWidth[ tileColIdx ]) << CtbLog2SizeY ) − 1
if( TileRightBoundaryPos[ i ] > pic_width_in_luma_samples − 1)
TileRightBoundaryPos[ i ] = pic_width_in_luma_samples − 1
TileTopBoundaryPos[ i ] = SubPicTopBoundaryPos +
( RowBd[ tileRowIdx ] << CtbLog2Size Y )
TileBotBoundaryPos[ i ] = SubPicTopBoundaryPos +
( ( RowBd[ tileRowIdx ] + RowHeight[ tileRowIdx ]) <<
CtbLog2SizeY) − 1
if( TileBotBoundaryPos[ i ] > pic_height_in_luma_samples − 1 )
TileBotBoundaryPos[ i ] = pic_height_in_luma_samples − 1
```

The tile_group_address specifies the tile address of the first tile in the tile group. When not present, the value of tile_group_address is inferred to be equal to zero. If rect_tile_group_flag is equal to 0, the following applies: the tile address is the tile ID; the length of tile_group_address is Ceil(Log2(NumTilesInSubPic)) bits; and the value of tile_group_address shall be in the range of zero to NumTilesInSubPic−1, inclusive. Otherwise (rect_tile_group_flag is equal to one), the following applies: the tile address is the tile group index of the tile group among tile groups in the sub-picture; the length of tile_group_address is Ceil(Log2(num_tile_groups_in_sub_pic_minus1+1)) bits; and the value of tile_group_address shall be in the range of 0 to num_tile_groups_in_sub_pic_minus1, inclusive.

It is a requirement of bitstream conformance that the following constraints apply. The value of tile_group_address shall not be equal to the value of tile_group_address of any other coded tile group NAL unit of the same coded sub-picture. The tile groups of a sub-picture shall be in increasing order of their tile_group_address values. The shapes of the tile groups of a sub-picture shall be such that each tile, when decoded, shall have its entire left boundary and entire top boundary consisting of a sub-picture boundary or consisting of boundaries of previously decoded tile(s).

The num_tiles_in_tile_group_minus1, when present, specifies the number of tiles in the tile group minus one. The value of num_tiles_in_tile_group_minus1 shall be in the range of zero to Num TilesInSubPic−1, inclusive. When not present, the value of num_tiles_in_tile_group_minus1 is inferred to be equal to zero. The variable NumTilesInCurrTileGroup, which specifies the number of tiles in the current tile group, and TgTileIdx[i], which specifies the tile index of the i-th tile in the current tile group, are derived as follows:

```
                                                          (7-35)
if( rect_tile_group_flag ) {
NumTilesInCurrTileGroup = NumTilesInTileGroup[ tile_group_address ]
tileIdx = top_left_tile_idx[ tile_group_address ]
for( j = 0, tIdx = 0; j <
   NumTileRowsInTileGroupMinus1[ tile_group_address ] + 1;
      j++, tileIdx += num_tile_columns_minus1 + 1 )
   for( i = 0, currTileIdx = tileIdx; i <
NumTileColumnsInTileGroupMinus1[ tile_group_address ] + 1;
      i++, currTileIdx++, tIdx++ )
      TgTileIdx[ tIdx ] = currTileIdx
} else {
NumTilesInCurrTileGroup = num_tiles_in_tile_group_minus1 + 1
TgTileIdx[ 0 ] = tile_group_address
for( i = 1; i < NumTilesInCurrTileGroup; i++ )
   TgTileIdx[ i ] = TgTileIdx[ i − 1 ] + 1
}
```

The tile_group_type specifies the coding type of the tile group.

An example derivation process for temporal luma motion vector prediction is as follows. The variables mvLXCol and availableFlagLXCol are derived as follows: If tile_group_temporal_mvp_enabled_flag is equal to zero, both components of mvLXCol are set equal to zero and availableFlagLXCol is set equal to zero. Otherwise (tile_group_temporal_mvp_enabled_flag is equal to one), the following ordered steps apply: The bottom right collocated motion vector, and the bottom and right boundary sample locations are derived as follows:

```
xColBr = xCb + cbWidth                                   (8-414)
yColBr = yCb + cbHeight                                  (8-415)
rightBoundaryPos = sub_pic_treated_as_pic_flag[ SubPicIdx
[ tile_group_subpic_id ] ] ?
```

-continued

```
SubPicRightBoundaryPos : pic_width_in_luma_samples – 1          (8-415)
botBoundaryPos = sub_pic_treated_as_pic_flag[ SubPicIdx
[ tile_group_subpic_id ] ] ?
SubPicBotBoundaryPos : pic_height_in_luma_samples – 1           (8-415)
```

If yCb>>CtbLog2Size Y is equal to yColBr>>CtbLog2SizeY, yColBr is less than or equal to botBoundaryPos and xColBr is less than or equal to rightBoundaryPos, the following applies: The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLX and sbFlag set equal to zero as inputs, and the output is assigned to mvLXCol and availableFlagLXCol. Otherwise, both components of mvLXCol are set equal to zero and availableFlagLXCol is set equal to zero.

An example luma sample bilinear interpolation process is as follows. The luma locations in full-sample units (xInti, yInti) are derived as follows for i=0 . . . 1. If sub_pic_treated_as_pic_flag[SubPicIdx[tile_group_subpic_id]] is equal to 1, the following applies:

```
xInti = Clip3( SubPicLeftBoundaryPos,                           (8-458)
SubPicRightBoundaryPos, xIntL + i )
yInti = Clip3( SubPicTopBoundaryPos,                            (8-458)
SubPicBotBoundaryPos, yIntL + i )
```

Otherwise (sub_pic_treated_as_pic_flag[SubPicIdx[tile_group_subpic_id]] is equal to 0), the following applies:

```
xInti = sps_ref_wraparound_enabled_flag ?                       (8-459)
    ClipH( ( sps_ref_wraparound_offset_minus1 + 1 ) *
MinCbSizeY, picW, ( xIntL + i ) ) :
    Clip3( 0, picW – 1, xIntL + i )
yInti = Clip3( 0, picH – 1, yIntL + i )                         (8-460)
```

An example luma sample 8-tap interpolation filtering process is as follows. The luma locations in full-sample units (xInti, yInti) are derived as follows for i=0 . . . 7. If sub_pic_treated_as_pic_flag[SubPicIdx[tile_group_subpic_id]] is equal to one, the following applies:

```
xInti = Clip3( SubPicLeftBoundaryPos,                           (8-830)
SubPicRightBoundaryPos, xIntL + i – 3 )
yInti = Clip3( SubPicTopBoundaryPos,                            (8-830)
SubPicBotBoundaryPos, yIntL +i – 3 )
```

Otherwise (sub_pic_treated_as_pic_flag[SubPicIdx[tile_group_subpic_id]] is equal to 0), the following applies:

```
xInti = sps_ref_wraparound_enabled_flag ?                       (8-831)
    ClipH( ( sps_ref_wraparound_offset_minus1 + 1 ) *
MinCbSizeY, picW, xIntL + i – 3 ) :
    Clip3( 0, picW – 1, xIntL + i – 3 )
yInti = Clip3( 0, picH – 1, yIntL + i – 3 )                     (8-832)
```

An example chroma sample interpolation process is as follows. The variable xOffset is set equal to (sps_ref_wraparound_offset_minus1+1)*MinCbSizeY)/SubWidthC. The chroma locations in full-sample units (xInti, yInti) are derived as follows for i=0 . . . 3:

If sub_pic_treated_as_pic_flag[SubPicIdx[tile_group_subpic_id]] is equal to one, the following applies:

```
xInti = Clip3( SubPicLeftBoundaryPos/SubWidthC,                 (8-844)
SubPicRightBoundaryPos/Sub WidthC, xIntL + i )
yInti = Clip3( SubPicTopBoundaryPos/SubHeightC,                 (8-844)
SubPicBotBoundaryPos/SubHeightC, yIntL + i )
Otherwise (sub_pic_treated_as_pic_flag[ SubPicIdx
[ tile_group_subpic_id ] ] is equal to 0 ), the following applies:
xInti = sps_ref_wraparound_enabled_flag ? ClipH( xOffset, picWC, xIntC +i – 1 ):  (8-845)
    Clip3( 0, picWC – 1, xIntC +i – 1 )
yInti = Clip3( 0, picHC – 1, yIntC + i – 1 )                    (8-846)
```

An example deblocking filter process is as follows. The deblocking filter process is applied to all coding sub-block edges and transform block edges of a picture, except the following types of edges: edges that are at the boundary of the picture; edges that coincide with boundaries of sub-pictures for which loop_filter_across_sub_pic_enabled_flag is equal to zero; edges that coincide with boundaries of tiles for which loop_filter_across_tiles_enabled_flag is equal to zero; edges that coincide with the upper or left boundaries of or within tile groups with tile_group_deblocking_filter_disabled_flag equal to one; edges that do not correspond to 8×8 sample grid boundaries of the considered component; edges within chroma components for which both sides of the edge use inter prediction; edges of chroma transform blocks that are not edges of the associated transform unit; and edges across the luma transform blocks of a coding unit that has an IntraSubPartitionsSplit value not equal to ISP_NO_SPLIT.

An example deblocking filter process for one direction is as follows. For each coding unit with coding block width log2CbW, coding block height log2CbH and location of top-left sample of the coding block (xCb, yCb), when edgeType is equal to EDGE_VER and xCh % 8 is equal zero or when edge Type is equal to EDGE_HOR and yCb % 8 is equal to zero, the edges are filtered by the following ordered steps. The coding block width nCbW is set equal to 1<<log2CbW and the coding block height nCbH is set equal to 1<<log2CbH. The variable filterEdgeFlag is derived as follows. If edgeType is equal to EDGE_VER and one or more of the following conditions are true, filterEdgeFlag is set equal to zero. The left boundary of the current coding block is the left boundary of the picture. The left boundary of the current coding block is the left or right boundary of the sub-picture and loop_filter_across_sub_pic_enabled_flag is equal to zero. The left boundary of the current coding block is the left boundary of the tile and loop_filter_across_tiles_enabled_flag is equal to zero. Otherwise if edgeType is equal to EDGE_HOR and one or more of the following conditions are true, the variable filterEdgeFlag is set equal to 0. The top boundary of the current luma coding block is the top boundary of the picture. The top boundary of the current coding block is the top or bottom boundary of the sub-picture and loop_filter_across_sub_pic_enabled_flag is equal to zero. The top boundary of the current coding block is the top boundary of the tile and loop_filter_across_tiles_enabled_flag is equal to zero. Otherwise, filterEdgeFlag is set equal to one.

An example CTB modification process is as follows. For all sample locations (xSi, ySj) and (xYi, yYj) with i=0 . . . nCtbSw−1 and j=0 . . . nCtbSh−1, depending on the values of pcm_loop_filter_disabled_flag, pcm_flag[xYi][yYj] and cu_transquant_bypass_flag of the coding unit which includes the coding block covering recPicture[xSi][ySj], the following applies. If one or more of the following conditions for all sample locations (xSik', ySjk') and (xYik', yYjk40 with k=0 . . . 1 are true, edgeIdx is set equal to 0. The sample at location (xSik', ySjk') is outside the picture boundaries. The sample at location (xSik', ySjk') belongs to a different sub-picture and loop_filter_across_sub_pic_enabled_flag in the tile group which the sample recPicture[xSi] [ySj] belongs to is equal to 0. The loop_filter_across_tiles_enabled_flag is equal to zero and the sample at location (xSik', ySjk') belongs to a different tile.

An example coding tree block filtering process for luma samples is as follows. For the derivation of the filtered reconstructed luma samples alfPictureL[x][y], each reconstructed luma sample inside the current luma coding tree block recPictureL[x][y] is filtered as follows with x, y=0. . . . CtbSizeY−1. The locations (hx, vy) for each of the corresponding luma samples (x, y) inside the given array recPicture of luma samples are derived as follows. If loop_filter_across_tiles_enabled_flag for the tile tileA containing the luma sample at location (hx, vy) is equal to zero, let the variable tileIdx be the tile index of tileA, the following applies:

| | |
|---|---|
| hx = Clip3( TileLeftBoundaryPos[ tileIdx ], TileRightBoundaryPos[ tileIdx ], xCtb + x ) | (8-1140) |
| vy = Clip3( TileTopBoundaryPos[ tileIdx ], TileBotBoundaryPos[ tileIdx ], yCtb + y ) | (8-1141) |

Otherwise, if loop_filter_across_sub_pic_enabled_flag in the sub-picture containing the luma sample at location (hx, vy) is equal to zero, the following applies:

| | |
|---|---|
| hx = Clip3( SubPicLeftBoundaryPos, SubPicRightBoundaryPos, xCtb + x ) | (8-1140) |
| vy = Clip3( SubPicTopBoundaryPos, SubPicBotBoundaryPos, yCtb + y ) | (8-1141) |
| Otherwise, the following applies: | |
| hx = Clip3( 0, pic_width_in_luma_samples − 1, xCtb + x ) | (8-1140) |
| vy = Clip3( 0, pic_height_in_luma_samples − 1, yCtb + y ) | (8-1141) |

An example derivation process for ALF transpose and filter index for luma samples is as follows. The locations (hx, vy) for each of the corresponding luma samples (x, y) inside the given array recPicture of luma samples are derived as follows. If loop_filter_across_tiles_enabled_flag for the tile tileA containing the luma sample at location (hx, vy) is equal to zero, let the tileIdx be the tile index of tileA, the following applies:

| | |
|---|---|
| hx = Clip3( TileLeftBoundaryPos[ tileIdx ], TileRightBoundaryPos[ tileIdx ], x ) | (8-1140) |
| vy = Clip3( TileTopBoundaryPos[ tileIdx ], TileBotBoundaryPos[ tileIdx ], y ) | (8-1141) |

Otherwise, if loop_filter_across_sub_pic_enabled_flag for the sub-picture containing the luma sample at location (hx, vy) is equal to zero, the following applies:

| | |
|---|---|
| hx = Clip3( SubPicLeftBoundaryPos, SubPicRightBoundaryPos, x ) | (8-1140) |
| vy = Clip3( SubPicTopBoundaryPos, SubPicBotBoundaryPos, y ) | (8-1141) |
| Otherwise, the following applies: | |
| hx = Clip3( 0, pic_width_in_luma_samples − 1, x ) | (8-1145) |
| vy = Clip3( 0, pic_height_in_luma_samples − 1, y ) | (8-1146) |

An example coding tree block filtering process for chroma samples is as follows. For the derivation of the filtered reconstructed chroma samples alfPicture[x][y], each reconstructed chroma sample inside the current chroma coding tree block recPicture[x][y] is filtered as follows with x, y=0 ... ctbSizeC−1. The locations (hx, vy) for each of the corresponding chroma samples (x, y) inside the given array recPicture of chroma samples are derived as follows. If loop_filter_across_tiles_enabled_flag for the tile tileA containing the chroma sample at location (hx, vy) is equal to zero, let the tileIdx be the tile index of tileA, the following applies:

hx = Clip3( TileLeftBoundaryPos[ tileIdx ]/SubWidthC, TileRightBoundaryPos[ tileIdx ]/Sub WidthC, xCtb + x )  (8-1140)
vy = Clip3( TileTopBoundaryPos[ tileIdx ]/Sub WidthC, TileBotBoundaryPos[ tileIdx ]/Sub WidthC, yCtb + y )  (8-1141)

Otherwise, if loop_filter_across_sub_pic_enabled_flag for the sub-picture containing the chroma sample at location (hx, vy) is equal to zero, the following applies:

hx = Clip3( SubPicLeftBoundaryPos/Sub WidthC, SubPicRightBoundaryPos/Sub WidthC, xCtb + x )  (8-1140)
vy = Clip3( SubPicTopBoundaryPos/Sub WidthC, SubPicBotBoundaryPos/SubWidthC, yCtb + y )  (8-1141)

Otherwise, the following applies:

hx = Clip3( 0, pic_width_in_luma_samples/SubWidthC − 1, xCtbC + x )  (8-1177)
vy = Clip3( 0, pic_height_in_luma_samples/SubHeightC − 1, yCtbC + y )  (8-1178)

The variable sum is derived as follows:

sum = AlfCoeffC[ 0 ] * ( recPicture[ hx, vy + 2 ] + recPicture[ hx, vy − 2 ] ) +
      AlfCoeffC[ 1 ] * ( recPicture[ hx + 1, vy + 1] + recPicture[ hx − 1, vy − 1] ) +
      AlfCoeffC[ 2 ] * ( recPicture[ hx, vy + 1] + recPicture[ hx,vy − 1] ) +              (8-1179)
      AlfCoeffC[ 3 ] * ( recPicture[ hx − 1, vy + 1] + recPicture[ hx +1, vy − 1] ) +
      AlfCoeffC[ 4 ] * ( recPicture[ hx + 2, vy ] + recPicture[ hx − 2, vy ] ) +
      AlfCoeffC[ 5 ] * ( recPicture[ hx + 1, vy ] + recPicture[ hx − 1, vy ] ) +
      AlfCoeffC[ 6 ] * recPicture[ hx, vy ]
sum = ( sum + 64 ) >> 7  (8-1180)

The modified filtered reconstructed chroma picture sample alfPicture[xCtbC+x][yCtbC+y] is derived as follows:

alfPicture[ xCtbC + x ][ yCtbC + y ] = Clip3(0, (1 << BitDepthC) − 1, sum )  (8-1181)

Figure 12:
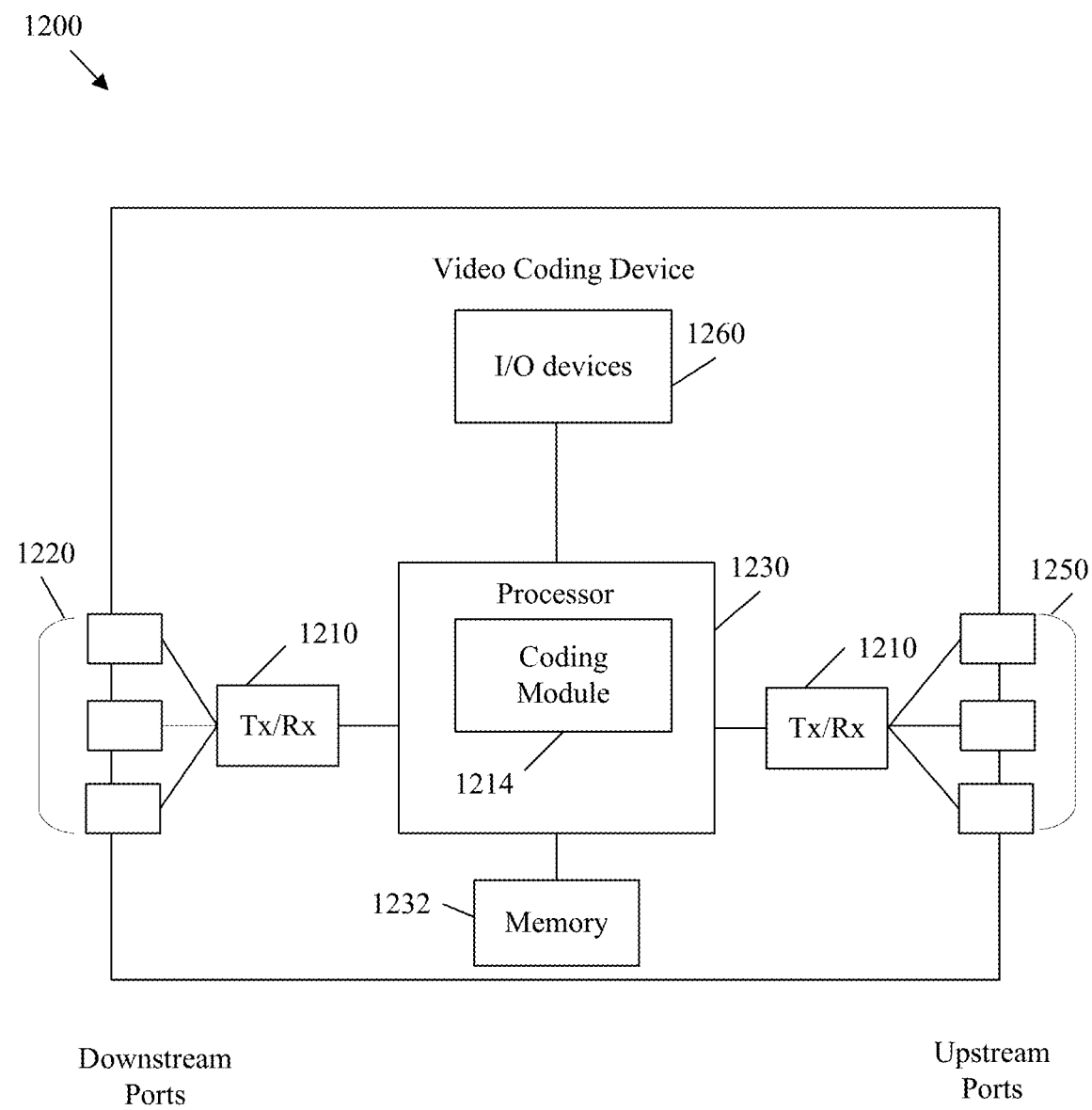
FIG. 12 is a schematic diagram of an example video coding device.

FIG. 12 is a schematic diagram of an example video coding device 1200. The video coding device 1200 is suitable for implementing the disclosed examples/embodiments as described herein. The video coding device 1200 comprises downstream ports 1220, upstream ports 1250, and/or transceiver units (Tx/Rx) 1210, including transmitters and/or receivers for communicating data upstream and/or downstream over a network. The video coding device 1200 also includes a processor 1230 including a logic unit and/or central processing unit (CPU) to process the data and a memory 1232 for storing the data. The video coding device 1200 may also comprise electrical, optical-to-electrical (OE) components, electrical-to-optical (EO) components, and/or wireless communication components coupled to the upstream ports 1250 and/or downstream ports 1220 for communication of data via electrical, optical, or wireless communication networks. The video coding device 1200 may also include input and/or output (I/O) devices 1260 for communicating data to and from a user. The I/O devices 1260 may include output devices such as a display for displaying video data, speakers for outputting audio data, etc. The I/O devices 1260 may also include input devices, such as a keyboard, mouse, trackball, etc., and/or corresponding interfaces for interacting with such output devices.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the downstream ports 1220, Tx/Rx 1210, upstream ports 1250, and memory 1232. The processor 1230 comprises a coding module 1214. The coding module 1214 implements the disclosed embodiments described herein, such as methods 100, 1300, and 1400, which may employ an in-loop filter 1000, a bitstream 1100, a picture 500, and/or current blocks 801 and/or 901 which may be coded according to unidirectional inter-prediction 600 and/or bidirectional inter-prediction 700 based on a candidate list generated according to pattern 900. The coding module 1214 may also implement any other method/mechanism described herein. Further, the coding module 1214 may implement a codec system 200, an encoder 300, and/or a decoder 400. For example, the coding module 1214 can implement the first, second, third, fourth, fifth, and/or sixth example implementation as described above. Hence, coding module 1214 causes the video coding device 1200 to provide additional functionality and/or coding efficiency when coding video data. As such, the coding module 1214 improves the functionality of the video coding device 1200 as well as addresses problems that are specific to the video coding arts. Further, the coding module 1214 effects a transformation of the video coding device 1200 to a different state. Alternatively, the coding module 1214 can be implemented as instructions stored in the memory 1232 and executed by the processor 1230 (e.g., as a computer program product stored on a non-transitory medium).

The memory 1232 comprises one or more memory types such as disks, tape drives, solid-state drives, read only memory (ROM), random access memory (RAM), flash memory, ternary content-addressable memory (TCAM), static random-access memory (SRAM), etc. The memory 1232 may be used as an over-flow data storage device, to store programs when such programs are selected for execution, and to store instructions and data that are read during program execution.

Figure 13:
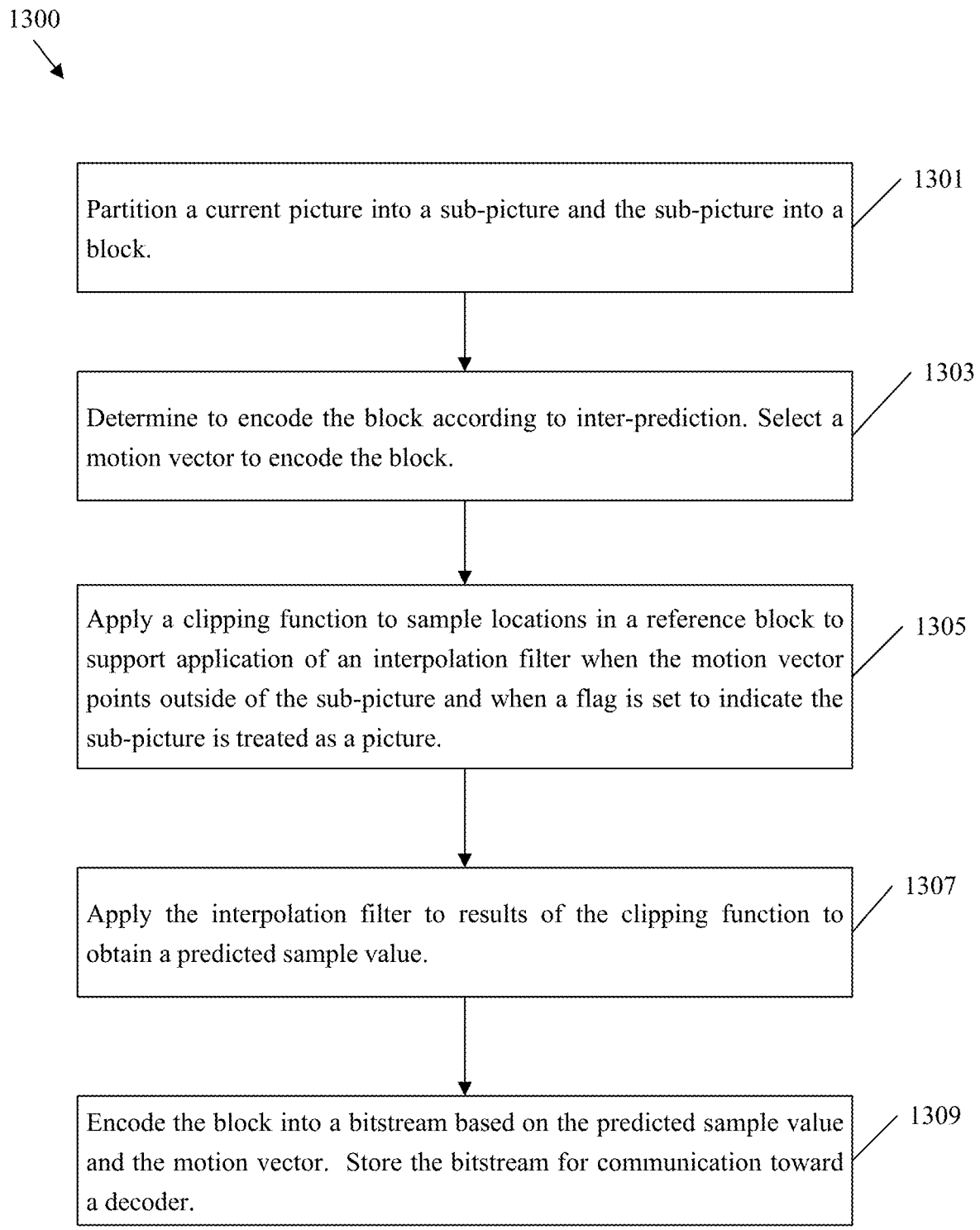
FIG. 13 is a flowchart of an example method of encoding a video sequence into a bitstream while applying a clipping function in an interpolation filter when a sub-picture is treated as a picture.

FIG. 13 is a flowchart of an example method 1300 of encoding a video sequence into a bitstream, such as bitstream 1100, while applying a clipping function in an interpolation filter, such as interpolation filter 913, when a sub-picture, such as sub-picture 510, is treated as a picture, such as picture 500. Method 1300 may be employed by an encoder, such as a codec system 200, an encoder 300, and/or a video coding device 1200 when performing method 100 to encode a current block 801 and/or 901 according to unidirectional inter-prediction 600 and/or bidirectional inter-prediction 700 by employing in-loop filter 1000 and/or on a candidate list generated according to pattern 900.

Method 1300 may begin when an encoder receives a video sequence including a plurality of pictures and determines to encode that video sequence into a bitstream, for example based on user input. At step 1301, the encoder partitions a current picture into a sub-picture. The encoder also partitions the sub-picture into a block. At step 1303, the encoder determines to encode the block according to inter-prediction. Accordingly, the encoder selects a motion vector to encode the block.

At step 1305, the encoder applies a clipping function to sample locations in a reference block pointed to by the motion vector. The clipping function is applied in order to support application of an interpolation filter when the motion vector points outside of the sub-picture. This process occurs when a flag is set to indicate the sub-picture is treated as a picture, and hence should be coded to support extraction that is independent of the other sub-pictures in the picture. In this context, a sub-picture is treated as a picture when the sub-picture is coded without reference to data in other sub-pictures, and hence can be separately extracted.

At step 1307, the encoder applies the interpolation filter to results of the clipping function to obtain a predicted sample value. In one example, the interpolation filter includes a luma sample bilinear interpolation process. In such a case, the block includes a block of luma samples. Further, the predicted sample value includes a predicted luma sample value. In this case, the luma sample bilinear interpolation process receives inputs including a luma location in full sample units (xIntL, yIntL). The luma sample bilinear interpolation process outputs a predicted luma sample value (predSampleLXL). In this case, the clipping function of step 1305 is applied to the sample locations as follows. When subpic_treated_as_pic_flag[SubPicIdx] is equal to one, the following applies:

xInti=Clip3(SubPicLeftBoundaryPos, SubPicRightBoundaryPos, xIntL+i), and yInti=Clip3(SubPicTopBoundaryPos, SubPicBotBoundaryPos, yIntL+i), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

In another example, the interpolation filter includes a luma sample eight tap interpolation filtering process. In this case, the block includes a block of luma samples, and the predicted sample value includes a predicted luma sample value. Also, the luma sample eight tap interpolation filtering process receives inputs including a luma location in full sample units (xIntL, yIntL). The luma sample bilinear interpolation process outputs a predicted luma sample value (predSampleLXL). Further, the clipping function of step 1305 is applied to the sample locations as follows. When subpic_treated_as_pic_flag[SubPicIdx] is equal to one, the following applies:

xInti=Clip3(SubPicLeftBoundaryPos, SubPicRight-
    BoundaryPos, xIntL+i−3), and yInti=Clip3(SubPicTopBoundaryPos, SubPicBot-
    BoundaryPos, yIntL+i−3), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

In another example, the interpolation filter includes a chroma sample interpolation process. In this case, the block includes a block of chroma samples, and the predicted sample value includes a predicted chroma sample value. In this case, the chroma sample interpolation process receives inputs including a chroma location in full sample units (xIntC, yIntC). Further, the chroma sample interpolation process outputs a predicted chroma sample value (predSampleLXC). In this case, the clipping function of step 1305 is applied to the sample locations as follows. When subpic_treated_as_pic_flag[SubPicIdx] is equal to one, the following applies:

xInti=Clip3(SubPicLeftBoundaryPos/SubWidthC,
    SubPicRightBoundaryPos/SubWidthC, xIntC+i),
    and yInti=Clip3(SubPicTopBoundaryPos/SubHeightC,
    SubPicBotBoundaryPos/SubHeightC, yIntC+i), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, SubWidthC and SubHeightC indicate a horizontal and vertical sampling rate ratio between luma and chroma samples, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

At step 1309, the encoder encodes the block into a bitstream based on the predicted sample value and the motion vector. The bitstream may then be stored for communication toward a decoder.

Figure 14:
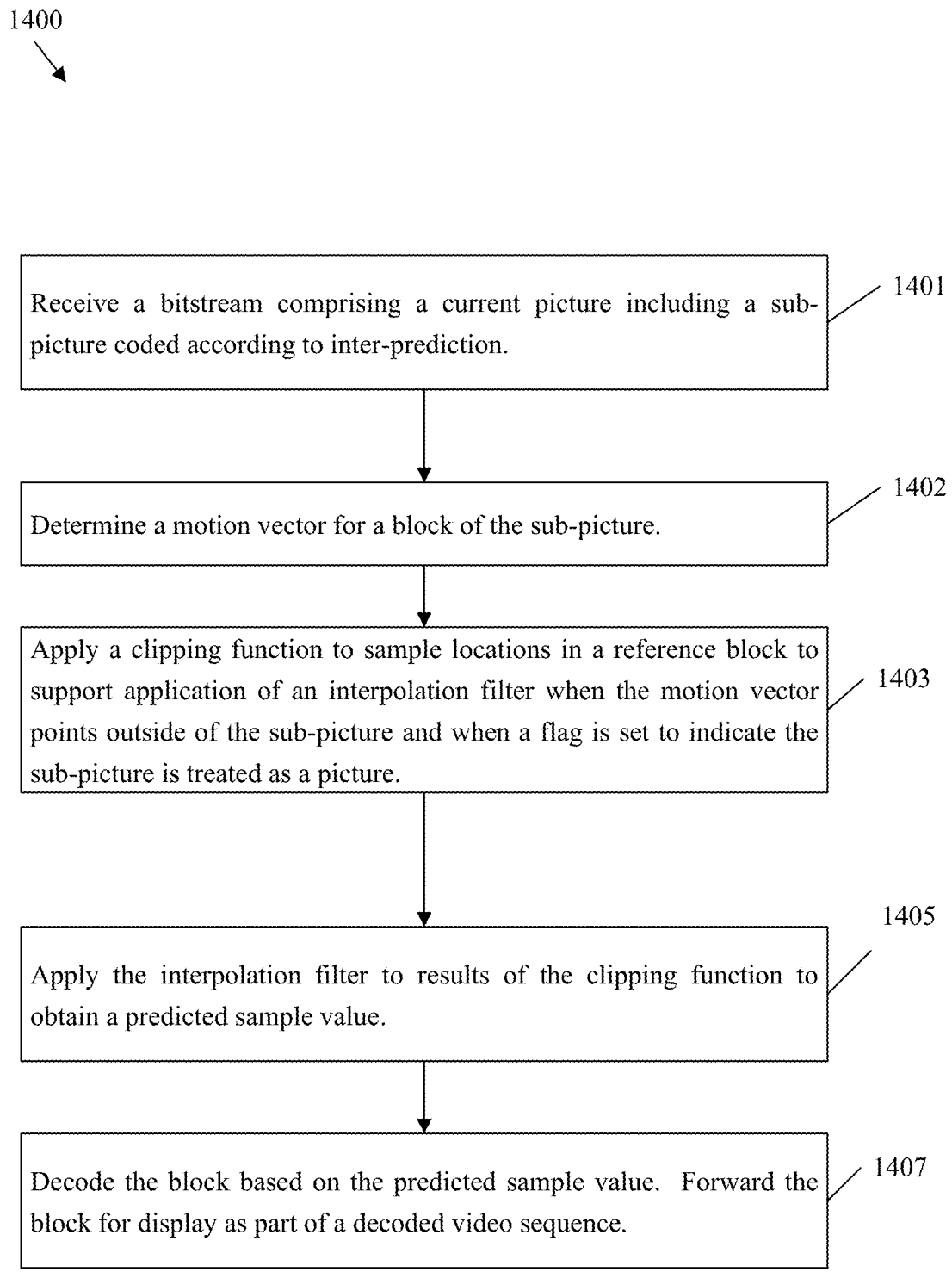
FIG. 14 is a flowchart of an example method of decoding a video sequence from a bitstream while applying a clipping function in an interpolation filter when a sub-picture is treated as a picture.

FIG. 14 is a flowchart of an example method 1400 of decoding a video sequence from a bitstream, such as bitstream 1100, while applying a clipping function in an interpolation filter, such as interpolation filter 913, when a sub-picture, such as sub-picture 510, is treated as a picture, such as picture 500. Method 1400 may be employed by a decoder, such as a codec system 200, a decoder 400, and/or a video coding device 1200 when performing method 100 to decode a current block 801 and/or 901 according to unidirectional inter-prediction 600 and/or bidirectional inter-prediction 700 by employing in-loop filter 1000 and/or on a candidate list generated according to pattern 900.

Method 1400 may begin when a decoder begins receiving a bitstream of coded data representing a video sequence, for example as a result of method 1300. At step 1401, the decoder receives a bitstream comprising a current picture including a sub-picture. The picture, sub-picture, slices, tiles, CTUs, and/or other sub-regions thereof are coded according to inter-prediction. At step 1402, the decoder determines a motion vector for a block of the sub-picture.

At step 1403, the decoder applies a clipping function to sample locations in a reference block pointed to by the motion vector. The clipping function is applied in order to support application of an interpolation filter when the motion vector points outside of the sub-picture. This process occurs when a flag is set to indicate the sub-picture is treated as a picture, and hence should be coded to support extraction that is independent of the other sub-pictures in the picture.

At step 1405, the decoder applies the interpolation filter to results of the clipping function to obtain a predicted sample value. In one example, the interpolation filter includes a luma sample bilinear interpolation process. In such a case, the block includes a block of luma samples. Further, the predicted sample value includes a predicted luma sample value. In this case, the luma sample bilinear interpolation process receives inputs including a luma location in full sample units (xIntL, yIntL). The luma sample bilinear interpolation process outputs a predicted luma sample value (predSampleLXL). In this case, the clipping function of step 1403 is applied to the sample locations as follows. When subpic_treated_as_pic_flag[SubPicIdx] is equal to one, the following applies:

xInti=Clip3(SubPicLeftBoundaryPos, SubPicRight-
    BoundaryPos, xIntL+i), and yInti=Clip3(SubPicTopBoundaryPos, SubPicBot-
    BoundaryPos, yIntL+i), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

In another example, the interpolation filter includes a luma sample eight tap interpolation filtering process. In this case, the block includes a block of luma samples, and the predicted sample value includes a predicted luma sample value. Also, the luma sample eight tap interpolation filtering process receives inputs including a luma location in full sample units (xIntL, yIntL). The luma sample bilinear interpolation process outputs a predicted luma sample value (predSampleLXL). Further, the clipping function of step 1403 is applied to the sample locations as follows. When subpic_treated_as_pic_flag[SubPicIdx] is equal to one, the following applies:

xInti=Clip3(SubPicLeftBoundaryPos, SubPicRight-
BoundaryPos, xIntL+i−3), and yInti=Clip3(SubPicTopBoundaryPos, SubPicBot-
BoundaryPos, yIntL+i−3), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

In another example, the interpolation filter includes a chroma sample interpolation process. In this case, the block includes a block of chroma samples, and the predicted sample value includes a predicted chroma sample value. In this case, the chroma sample interpolation process receives inputs including a chroma location in full sample units (xIntC, yIntC). Further, the chroma sample interpolation process outputs a predicted chroma sample value (predSampleLXC). In this case, the clipping function of step 1403 is applied to the sample locations as follows. When subpic_treated_as_pic_flag[SubPicIdx] is equal to one, the following applies:

xInti=Clip3(SubPicLeftBoundaryPos/SubWidthC,
SubPicRightBoundaryPos/SubWidthC, xIntC+i),
and yInti=Clip3(SubPicTopBoundaryPos/SubHeightC,
SubPicBotBoundaryPos/SubHeightC, yIntC+i), where subpic_treated_as_pic_flag is the flag set to indicate the sub-picture is treated as a picture, SubPicIdx is an index of the sub-picture, xInti and yInti are a clipped sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, SubPicBotBoundaryPos is a position of a bottom boundary of the sub-picture, SubWidthC and SubHeightC indicate a horizontal and vertical sampling rate ratio between luma and chroma samples, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

At step 1407, the decoder decodes the block based on the predicted sample value. The decoder can then forward the block for display as part of a decoded video sequence.

Figure 15:
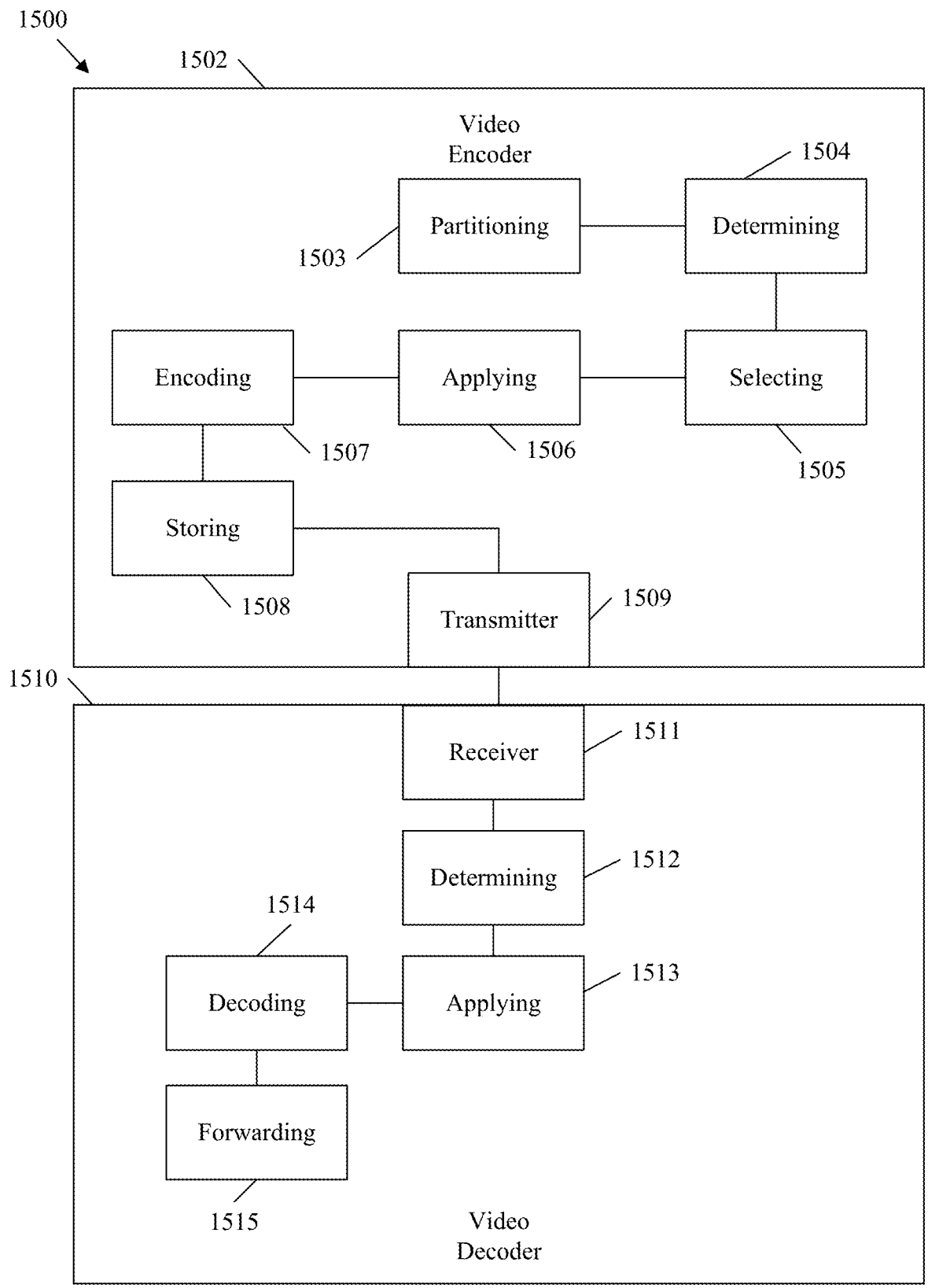
FIG. 15 is a schematic diagram of an example system for coding a video sequence of images in a bitstream while applying a clipping function in an interpolation filter when a sub-picture is treated as a picture.

FIG. 15 is a schematic diagram of an example system 1500 for coding a video sequence of images in a bitstream, such as bitstream 1100, while applying a clipping function in an interpolation filter, such as interpolation 913, when a sub-picture, such as sub-picture 510, is treated as a picture, such as picture 500. System 1500 may be implemented by an encoder and a decoder such as a codec system 200, an encoder 300, a decoder 400, and/or a video coding device 1200. Further, system 1500 may be employed when implementing method 100, 1300, and/or 1400 to code a current block 801 and/or 901 according to unidirectional inter-prediction 600 and/or bidirectional inter-prediction 700 by employing in-loop filter 1000 and/or on a candidate list generated according to pattern 900.

The system 1500 includes a video encoder 1502. The video encoder 1502 comprises a partitioning module 1503 for partitioning a current picture into a sub-picture and the sub-picture into a block. The video encoder 1502 further comprises a determining module 1504 for determining to encode the block according to inter-prediction. The video encoder 1502 further comprises a selecting module 1505 for selecting a motion vector to encode the block. The video encoder 1502 further comprises an applying module 1506 for applying a clipping function to sample locations in a reference block to support application of an interpolation filter when the motion vector points outside of the sub-picture and when a flag is set to indicate the sub-picture is treated as a picture. The applying module 1506 is also for applying the interpolation filter to results of the clipping function to obtain a predicted sample value. The video encoder 1502 further comprises an encoding module 1507 for encoding the block into a bitstream based on the predicted sample value and the motion vector. The video encoder 1502 further comprises a storing module 1508 for storing the bitstream for communication toward a decoder. The video encoder 1502 further comprises a transmitting module 1509 for transmitting the bitstream toward video decoder 1510. The video encoder 1502 may be further configured to perform any of the steps of method 1300.

The system 1500 also includes a video decoder 1510. The video decoder 1510 comprises a receiving module 1511 for receiving a bitstream comprising a current picture including a sub-picture coded according to inter-prediction. The video decoder 1510 further comprises a determining module 1512 for determining a motion vector for a block of the sub-picture. The video decoder 1510 further comprises an applying module 1513 for applying a clipping function to sample locations in a reference block to support application of an interpolation filter when the motion vector points outside of the sub-picture and when a flag is set to indicate the sub-picture is treated as a picture. The applying module 1513 is also for applying the interpolation filter to results of the clipping function to obtain a predicted sample value. The video decoder 1510 further comprises a decoding module 1514 for decoding the block based on the predicted sample value. The video decoder 1510 further comprises a forwarding module 1515 for forwarding the block for display as part of a decoded video sequence. The video decoder 1510 may be further configured to perform any of the steps of method 1400.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, comprising:
receiving a current picture including a sub-picture with a block coded according to inter-prediction;
determining a motion vector for the block;
applying a clipping function to sample locations in a reference block during application of an interpolation process when a flag is set to indicate the sub-picture is treated as a picture;
applying the interpolation process to results of the clipping function to obtain a predicted sample value; and
decoding the block based on the predicted sample value,
wherein the interpolation process includes a luma sample bilinear interpolation process, wherein the block includes a block of luma samples, wherein the predicted sample value includes a predicted luma sample value, wherein the luma sample bilinear interpolation process receives inputs including a luma location in full sample units ($xInt_L$, $yInt_L$), and wherein the luma sample bilinear interpolation process outputs the predicted luma sample value ($predSampleLX_L$), and wherein the clipping function is applied to the sample locations according to:

$xInti = Clip3(SubPicLeftBoundaryPos, SubPicRight\text{-}BoundaryPos, xInt_L+i)$, and $yInti = Clip3(SubPicTopBoundaryPos, SubPicBot\text{-}BoundaryPos, yInt_L+i)$, where xInti and yInti are a sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, and where SubPicBotBoundaryPos is a position of a bottom boundary of the sub-picture, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

2. The method of claim 1, wherein the clipping function is applied to the sample locations when subpic_treated_as_pic_flag[SubPicIdx] is equal to one, where subpic_treated_as_pic_flag is the flag set to indicate the sub-picture is treated as a picture, SubPicIdx is an index of the sub-picture.

3. The method of claim 1, wherein the interpolation process includes a luma sample interpolation filtering process.

4. A method implemented by an encoder, comprising:
partitioning a current picture into a sub-picture and the sub-picture into a block;
determining to encode the block according to inter-prediction;
selecting a motion vector to encode the block;
applying a clipping function to sample locations in a reference block to support application of an interpolation process when the motion vector points outside of the sub-picture and when a flag is set to indicate the sub-picture is treated as a picture;
applying the interpolation process to results of the clipping function to obtain a predicted sample value;
encoding the block into a bitstream based on the predicted sample value and the motion vector; and
storing the bitstream for communication toward a decoder,
wherein the interpolation process includes a luma sample bilinear interpolation process, wherein the block includes a block of luma samples, wherein the predicted sample value includes a predicted luma sample value, wherein the luma sample bilinear interpolation process receives inputs including a luma location in full sample units ($xInt_L$, $yInt_L$), and wherein the luma sample bilinear interpolation process outputs the predicted luma sample value ($predSampleLX_L$), and
wherein the clipping function is applied to the sample locations according to:

$xInti = Clip3(SubPicLeftBoundaryPos, SubPicRight\text{-}BoundaryPos, xInt_L+i)$, and $yInti = Clip3(SubPicTopBoundaryPos, SubPicBot\text{-}BoundaryPos, yInt_L+i)$, where xInti and yInti are a sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, and where SubPicBotBoundaryPos is a position of a bottom boundary of the sub-picture, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

5. The method of claim 4, wherein the clipping function is applied to the sample locations when subpic_treated_as_pic_flag[SubPicIdx] is equal to one, where subpic_treated_as_pic_flag is the flag set to indicate the sub-picture is treated as a picture and SubPicIdx is an index of the sub-picture.

6. The method of claim 4, wherein the interpolation process includes a luma sample interpolation filtering process.

7. A decoder, comprising:
a receiver configured to receive a current picture including a sub-picture with a block coded according to inter-prediction; and
one or more processors coupled to the receiver and configured to:
determine a motion vector for the block;
apply a clipping function to sample locations in a reference block during application of an interpolation process when a flag is set to indicate the sub-picture is treated as a picture;
apply the interpolation process to results of the clipping function to obtain a predicted sample value; and
decode the block based on the predicted sample value, wherein the interpolation process includes a luma sample bilinear interpolation process, wherein the block includes a block of luma samples, wherein the predicted sample value includes a predicted luma sample value, wherein the luma sample bilinear interpolation process receives inputs including a luma location in full sample units (xInt$_L$, yInt$_L$), and wherein the luma sample bilinear interpolation process outputs the predicted luma sample value (predSampleLX$_L$), and wherein the clipping function is applied to the sample locations according to:

xInti=Clip3(SubPicLeftBoundaryPos, SubPicRightBoundaryPos, xInt$_L$+i), and yInti=Clip3(SubPicTopBoundaryPos, SubPicBotBoundaryPos, yInt$_L$+i), where xInti and yInti are a sample location at index i, SubPicRightBoundaryPos is a position of a right boundary of the sub-picture, SubPicLeftBoundaryPos is a position of a left boundary of the sub-picture, SubPicTopBoundaryPos is a position of a top boundary of the sub-picture, and where SubPicBotBoundaryPos is a position of a bottom boundary of the sub-picture, and Clip3 is the clipping function according to:

$$Clip3(x, y, z) = \begin{cases} x; & z < x \\ y; & z > y \\ z; & \text{otherwise} \end{cases}$$

where x, y, and z are numerical input values.

8. The decoder of claim 7, wherein the clipping function is applied to the sample locations when subpic_treated_as_pic_flag[SubPicIdx] is equal to one, where subpic_treated_as_pic_flag is the flag set to indicate the sub-picture is treated as a picture and SubPicIdx is an index of the sub-picture.

9. The decoder of claim 7, wherein the interpolation process includes a luma sample interpolation filtering process.

\* \* \* \* \*